United States Patent
Chang et al.

(10) Patent No.: US 10,354,182 B2
(45) Date of Patent: Jul. 16, 2019

(54) IDENTIFYING RELEVANT CONTENT ITEMS USING A DEEP-STRUCTURED NEURAL NETWORK

(71) Applicant: Microsoft Technology Licensing, LLC, Redmond, WA (US)

(72) Inventors: Keng-hao Chang, Mountain View, CA (US); Ruofei Zhang, Mountain View, CA (US); Shuangfei Zhai, Binghamton, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 751 days.

(21) Appl. No.: 14/926,617

(22) Filed: Oct. 29, 2015

(65) Prior Publication Data

US 2017/0124447 A1    May 4, 2017

(51) Int. Cl.
| | |
|---|---|
| *G06N 3/04* | (2006.01) |
| *G06N 3/08* | (2006.01) |
| *G06F 16/33* | (2019.01) |
| *G06F 17/27* | (2006.01) |
| *G06F 16/951* | (2019.01) |

(52) U.S. Cl.
CPC ....... *G06N 3/0472* (2013.01); *G06F 16/3334* (2019.01); *G06F 16/951* (2019.01); *G06F 17/2765* (2013.01); *G06F 17/2785* (2013.01); *G06N 3/08* (2013.01)

(58) Field of Classification Search
CPC . G06N 3/0472; G06N 3/084; G06F 17/30731
See application file for complete search history.

(56) References Cited

U.S. PATENT DOCUMENTS

| | | |
|---|---|---|
| 8,180,754 B1 | 5/2012 | Ershov |
| 8,504,361 B2 | 8/2013 | Collobert et al. |

(Continued)

OTHER PUBLICATIONS

Mesnil, Grégoire, Xiaodong He, Li Deng, and Yoshua Bengio. "Investigation of recurrent-neural-network architectures and learning methods for spoken language understanding." In Interspeech, pp. 3771-3775. Aug. 25-29, 2013.*

(Continued)

*Primary Examiner* — Alexey Shmatov
*Assistant Examiner* — Casey R. Garner
(74) *Attorney, Agent, or Firm* — Rainier Patents, P.S.

(57) ABSTRACT

A computer-implemented technique is described herein for identifying one or more content items that are relevant to an input linguistic item (e.g., an input query) using a deep-structured neural network, trained based on a corpus of click-through data. The input linguistic item has a collection of input tokens. The deep-structured neural network includes a first part that produces word embeddings associated with the respective input tokens, a second part that generates state vectors that capture context information associated with the input tokens, and a third part which distinguishes important parts of the input linguistic item from less important parts. The second part of the deep-structured neural network can be implemented as a recurrent neural network, such as a bi-directional neural network. The third part of the deep-structured neural network can generate a concept vector by forming a weighted sum of the state vectors.

20 Claims, 11 Drawing Sheets

(56) References Cited

U.S. PATENT DOCUMENTS

| | | | |
|---|---|---|---|
| 8,533,130 | B2 | 9/2013 | Ershov |
| 8,892,488 | B2 | 11/2014 | Qi et al. |
| 9,934,515 | B1* | 4/2018 | Anderson ............. G06F 16/951 |
| 2010/0250580 | A1* | 9/2010 | Balakrishnan .... G06F 17/30386 707/769 |
| 2014/0229158 | A1* | 8/2014 | Zweig ...................... G06N 3/04 704/9 |
| 2014/0257803 | A1 | 9/2014 | Yu et al. |
| 2014/0278379 | A1 | 9/2014 | Coccaro et al. |
| 2015/0074027 | A1* | 3/2015 | Huang ................. G06N 3/0454 706/25 |
| 2015/0095017 | A1 | 4/2015 | Mnih et al. |
| 2015/0220833 | A1 | 8/2015 | Le |
| 2015/0227845 | A1* | 8/2015 | Hakkani-Tur ...... G06F 17/2785 706/52 |
| 2015/0278200 | A1* | 10/2015 | He ...................... G06F 17/2785 704/2 |

OTHER PUBLICATIONS

Liu, Xiaodong, Jianfeng Gao, Xiaodong He, Li Deng, Kevin Duh, and Ye-Yi Wang. "Representation learning using multi-task deep neural networks for semantic classification and information retrieval." (May 31-Jun. 5, 2015).*

Shi, Yangyang, Kaisheng Yao, Hu Chen, Yi-Cheng Pan, Mei-Yuh Hwang, and Baolin Peng. "Contextual spoken language understanding using recurrent neural networks." In Acoustics, Speech and Signal Processing (ICASSP), 2015 IEEE International Conference on, pp. 5271-5275. IEEE, Apr. 19-24, 2015.*

Shen, Yelong, Xiaodong He, Jianfeng Gao, Li Deng, and Gregoire Mesnil. "A latent semantic model with convolutional-pooling structure for information retrieval." In Proceedings of the 23rd ACM International Conference on Conference on Information and Knowledge Management, pp. 101-110. ACM, Nov. 3-7, 2014.*

Shen, Yelong, Xiaodong He, Jianfeng Gao, Li Deng, and Grégoire Mesnil. "Learning semantic representations using convolutional neural networks for web search." In Proceedings of the 23rd International Conference on World Wide Web, pp. 373-374. ACM, Apr. 7-11, 2014.*

Chintala, Soumith, "Understanding Natural Language with Deep Neural Networks Using Torch," available at: «http://devblogs.nvidia.com/parallelforall/understanding-natural-language-deep-neural-networks-using-torch/», NVIDIA Cuda Zone, NVIDIA Corporation, published on Mar. 3, 2015, 11 pages.

Bian, et al., "Knowledge-Powered Deep Learning for Word Embedding," in the Proceedings of the 7th European Conference on Machine Learning and Principles and Practice of Knowledge Discovery in Databases, Sep. 2014, 16 pages.

"Deep Learning, NLP, and Representations," available at «http://colah.github.io/posts/2014-07-NLP-RNNs-Representations/», colah's blog, published Jul. 7, 2014, 16 pages.

"Sentiment Analysis with Word2vec," available at «http://deeplearning4j.org/sentiment_analysis_word2vec.html», DL4J Deep Learning for Java, retrieved on Oct. 20, 2015, 8 pages.

Li, et al., "Deep Learning Powered In-Session Contextual Ranking using Clickthrough Data," in Proceedings of Workshop on Personalization: Methods and Applications, at Neural Information Processing Systems (NIPS), Dec. 12, 2014, 9 pages.

Cui, et al., "KNET: A General Framework for Learning Word Embedding Using Morphological Knowledge," in ACM Transactions on Information Systems, vol. 34, No. 1, Article 4, Aug. 2015, 25 pages.

Xu, et al., "Contextual Domain Classification in Spoken Language Understanding Systems Using Recurrent Neural Network," in Proceedings of IEEE International Conference on Acoustics, Speech and Signal Processing, May 4, 2014, 5 pages.

Palangi, et al., "Deep Sentence Embedding Using Long Short-Term Memory Networks," available at «http://arxiv.org/pdf/1502.06922.pdf», arXiv:1502.06922 [cs.CL], Jul. 5, 2015, 20 pages.

Huang, et al., "Learning Deep Structured Semantic Models for Web Search using Clickthrough Data," in Proceedings of the 22nd ACM International Conference on Information & Knowledge Management, Oct. 2013, 6 pages.

Shen, et al., "Learning Semantic Representations Using Convolutional Neural Networks for Web Search," Proceedings of the 23rd International Conference on World Wide Web, Apr. 2014, 2 pages.

"Latent semantic analysis," available at «https://en.wikipedia.org/wiki/Latent_semantic_analysis», Wikipedia article, retrieved on Oct. 20, 2015, 6 pages.

Collobert, et al., "Natural Language Processing (Almost) from Scratch," in Journal of Machine Learning Research, No. 12, Aug. 2011, 45 pages.

Recurrent neural network, available at «https://en.wikipedia.org/wiki/Recurrent_neural_network», Wikipedia article, retrieved on Oct. 20, 2015, 9 pages.

Zeiler, Matthew D., "ADADELTA: An Adaptive Learning Rate Method," available at «http://arxiv.org/abs/1212.5701», arXiv:1212.5701v1 [cs.LG], Dec. 22, 2012, 6 pages.

International Search Report and Written Opinion dated Jan. 20, 2017 from PCT Patent Application No. PCT/US2016/058335, 11 pages.

Bahdanau, Dzmitry, et al., "Neural machine translation by jointly learning to align and translate", Published as a Conference Paper at ICLR, 2015, 15 Pages.

Bergstra, James, et al., "Theano: a CPU and GPU math expression compiler", In Proceedings of 9th Python in Science Conf, vol. 1, 2010., Jun. 2010, 7 Pages.

Blei, David M., et al., "Latent dirichlet allocation", In The Journal of Machine Learning Research, 3 , 2003, Jan. 3, 2003, 993-1022 Pages.

Deerwester, Scott, et al., "Indexing by Latent Semantic Analysis", In The Journal of the American Society for Information Science, 41(6), Sep. 1990, 34 Pages.

Greff, Klaus, et al., "LSTM: A search space odyssey", In The Journal of IEEE transactions on Neural Networks and Learning Systems, 28, 10, 2017, Jul. 8, 2016, 12 Pages.

Hochreiter, Sepp, et al., "Long short-term memory. Neural computation,", In The Journal Neural Computation, vol. 9, 8, Nov. 15, 1997, 32 Pages.

Hofmann, Thomas, "Probabilistic Latent Semantic Indexing", In Proceedings of the 22nd annual international ACM SIGIR conference on Research and development in information retrieval, Aug. 15, 1999, 8 Pages.

Xu, Kelvin, et al., "Show, Attend and Tell: Neural Image Caption Generation with Visual Attention", In International Conference on Machine Learning. 2015., Jun. 1, 2015, 10 Pages.

Jin, Rong, et al., "Learn to Weight Terms in Information Retrieval using Category Information", In Proceedings of the 22nd International Conference on Machine Learning, ICML, 2005, Aug. 7, 2005, 8 Pages.

Jones, Rosie, et al., "Generating Query Substitutions", In Proceedings of the 15th International Conference on World Wide Web, WWW, 2006, May 23, 2006, 10 Pages.

Jones, Rose, et al., "Query Word Deletion Prediction", In Proceedings of the 26th Annual International ACM SIGIR Conference on Research and Development in Informaion Retrieval, SIGIR '03, Jul. 28, 2003, 2 Pages.

Ling, Wang, et al., "Not All Contexts Are Created Equal: Better Word Representations With Variable Attention", In Proceedings of the 2015 Conference on Empirical Methods in Natural Language Processing, 2015, 1367-1372 Pages.

Liu, Pengqi, et al., "Contextual Query Intent Extraction for Paid Search Selection", In Proceedings of the 24th International Conference on World Wide Web, May 18, 2015, 71-72 Pages.

Lv, Yuanhua, et al., "Lower-Bounding Term Frequency Normalization", In Proceedings of the 20th ACM International Conference on Information and Knowledge Management, CIKM, 2011, Oct. 24, 2011, 7-16 Pages.

Maron, M E., et al.. "On Relevance, Probabilistic Indexing and Information Retrieval", In The Journal of the ACM (JACM), vol. 7, 3, 1960, Jul. 1960, 216-244 Pages.

(56) References Cited

OTHER PUBLICATIONS

Maxwell, K Tamsin., et al., "Compact Query Term Selection using Topically Related text", In Proceedings of the 36th International ACM SIGIR Conference on Research and Development in Information Retrieval, SIGIR '13, Jul. 28, 2013, 583-592 Pages.

Zhai, Shuangfei, "Deepintent: Learning Attentions for Online Advertising with Recurrent Neural Networks", In Proceedings of the 22nd ACM SIGKDD international conference on knowledge discovery and data mining, Aug. 13, 2016, 10 Pages.

Provost, Foster, et al., "The Case Against Accuracy Estimation for Comparing Induction Algorithms", In Proceedings of the Fifteenth international Conference on Machine Learning, Jul. 24, 1998, 9 Pages.

Robertson, S E., et al., "Okapi At Trec-3", In The Journal of NIST Special Publication Sp, vol. 109, 1995, Jan. 1995, 19 Pages.

Sutskever, Ilya, et al., "Sequence to Sequence Learning with Neural Networks", In The Book of Advances in Neural Information Processing Systems, 2014, 9 Pages.

Thompson, Kevyn Collins., et al., "Query Expansion Using Random Walk Models", In Proceedings of the 14th ACM International Conference on Information and Knowledge Management, CIKM, 2005, Oct. 31, 2005, 8 Pages.

Turney, Peter D., et al., "From Frequency to Meaning: Vector Space Models of Semantics", In The Journal of Arti?cial Intelligence Research 37 (2010), Feb. 2010, 141-188 Pages.

* cited by examiner

IDENTIFYING RELEVANT CONTENT ITEMS USING A DEEP-STRUCTURED NEURAL NETWORK

BACKGROUND

A search engine typically matches a user's input query against a collection of content items (e.g., web pages, documents, ads, etc.) by comparing the tokens of the query with the tokens associated with respective candidate content items. Many times, however, the user's query and/or the content items correspond to "noisy" linguistic items having arbitrary lengths. For instance, a linguistic item can be considered noisy when it contains one or more tokens that do not contribute the expression of the main underlying meaning of the linguistic item, to any significant extent. Long queries (sometimes referred to as a tail queries) and long document summaries may be particularly prone to this problem. Due to the presence of such noise, a search engine may sometimes have difficulty interpreting the user's input query and/or the content items, and may therefore have difficulty in identifying content items that are truly relevant to the user's input query.

SUMMARY

A computer-implemented technique is described herein for identifying content items that are relevant to an input linguistic item. In one implementation, the technique operates by receiving an input linguistic item (such as a query) from a user computing device. The input linguistic item has a set of input tokens. The technique then interprets the input linguistic item using a deep-structured neural network that includes at least three parts. A first part produces word embeddings associated with the respective input tokens. A second part generates state vectors for the respective input tokens. The state vectors reflect the respective contexts of the input tokens within the input linguistic item. A third part provides probability information that distinguishes important parts of the input linguistic item from less important parts. The third part can also (optionally) generate a concept vector based on the state vectors and the probability information. The concept vector describes the meaning of the input linguistic item as a whole. The technique then generates at least one output result item based, at least in part, on the probability information and/or the concept vector. The output result item(s) identify at least one content item (document, ad, etc.) that is relevant to the input linguistic item.

According to another illustrative aspect, the second part of the deep-structured neural network is a recurrent neural network, such as a bi-directional neural network.

According to another illustrative aspect, the technique generates the concept vector by forming a weighted sum of the state vectors, based on the probability information.

According to another illustrative aspect, the technique can use the same kind of three-part deep-structured neural network described above to generate another concept vector associated with each candidate content item under consideration. The technique can then determine the relevance of the candidate content item to the input linguistic item (e.g., a query) by comparing the concept vector ($y_D$) associated with the candidate content item with the concept vector ($y_Q$) associated with the input linguistic item.

According to another illustrative aspect, the technique trains the deep-structured neural network based on a corpus of click-through data.

Among its technical merits, the technique provides a mechanism for discriminating between meaningful parts of linguistic information from less meaningful parts, thereby efficiently and effectively dealing with potentially noisy linguistic items having arbitrary lengths. In one environment, a search engine may leverage the mechanism to provide highly relevant content items to a user upon the user's submission of a query. In that use environment, the mechanism facilitates the user's interaction with the search engine (e.g., by quickly providing relevant output result items to the user), and also contributes to the efficient use of the search engine's resources. The mechanism also potentially enhances the profitability of the search engine, as well as the profitability of the advertisers who place ads with the search engine.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 employs one or more instances of the semantic transformation component to process an input linguistic item and/or content items.

Figure 1:
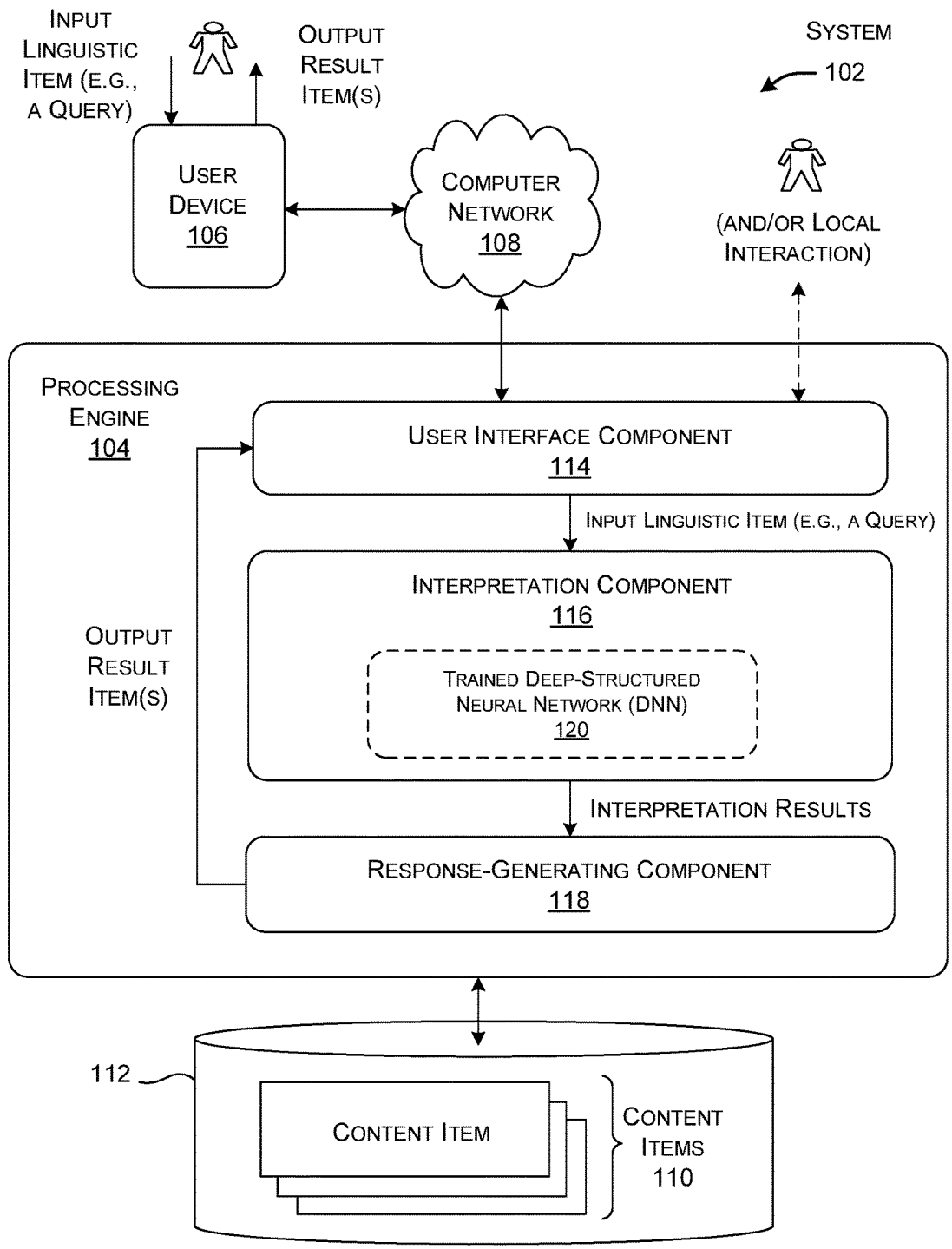
FIG. 1 shows an overview of a system for identifying relevant content items using a deep-structured neural network.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for identifying relevant content items using a deep-structured neural network. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. The various components shown in the figures can be implemented, for instance, by software running on computer equipment, hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by, for instance, software running on computer equipment, hardware (e.g., chip-implemented logic functionality), etc., or any combination thereof.

As to terminology, the phrase "configured to" encompasses various ways that physical and tangible functionality can be constructed to perform an identified operation. The functionality can be configured to perform an operation using, for instance, software running on computer equipment, hardware (e.g., chip-implemented logic functionality), etc., or any combination thereof.

The term "logic" encompasses various instances of physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, however implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows a system 102 that receives an input linguistic item from a user and, in response, determines zero, one or more content items that are relevant to the input linguistic item. In one use case scenario, the input linguistic item may correspond to a query that a user submits to a search engine or an advertisement-serving engine. In that context, a relevant content item may correspond to a document, ad, etc. returned by the search engine or advertisement-serving engine. In another use case scenario, the input linguistic item corresponds to a question or command presented by a user to a digital personal assistant, e.g., via text-based input, voice-based input, etc. In that context, a relevant content item may correspond to an appropriate response identified by the digital personal assistant. To nevertheless facilitate and simplify explanation, the system 102 will be principally described below with reference to the first-mentioned use case scenario in which the input linguistic item corresponds to a query and the content item correspond to a document, ad, etc.

Each input linguistic item has one or more input tokens, also referred to herein as input words. Similarly, each candidate content item is composed of one or more item tokens, also referred to herein as item words. A token (or word), in turn, corresponds to any meaningful unit of information that is composed of one or more symbols (e.g., characters). The input linguistic item can have any arbitrary length, meaning that it may be composed by any number of tokens. Similarly, any candidate content item can have any arbitrary length, although, in some cases, superior performance may be obtained for relatively concise content items of one or more phrases or sentences, rather than, e.g., multi-page-sized content items.

In one implementation, a processing engine 104 implements all or most of the processing that is performed on an input linguistic item. A user may interact with the processing engine 104 using a user device 106, also referred to as a user computing device. FIG. 1 shows a single user device 106, but the system 102 can accommodate any number of user devices, operated by respective users. A computer network 108 couples the user device 106 to the processing engine 104.

In another implementation, one or more functions attributed to the processing engine 104 can be instead (or in addition) performed in local fashion by each user device, such as the user device 106. In another implementation, the entirety of the processing engine 104 represents a local component provided by each user device, such as the user device 106. Here, the user may directly interact with the processing engine 104 without the exchange of information over the computer network 108.

The processing engine 104 may correspond to one or more server computing devices, optionally together with other digital processing equipment (e.g., routers, load-balancers, etc.). The computing devices associated with the processing engine 104 may be provided at a single location, or may be distributed over plural locations. Each user device (such as the user device 106) can correspond to any computing device, such as a desktop personal computing device, a game console device, a set-top box device, a laptop computing device, a tablet-type computing device, a smartphone or other type of telephone device, a wearable computing device, and so on. The computer network 108 may correspond to a local area network, a wide area network (e.g., the Internet), one or more point-to-point communication links, etc., or any combination thereof.

In one use case scenario, the processing engine 104 may represent at least part of a search engine. In another use case scenario, the processing engine 104 may represent at least part of an advertisement-serving engine. In another use case scenario, the processing engine 104 may represent an online digital personal assistant, and so on.

In some cases, a query Q, as the term is broadly used herein, may refer to a linguistic item that the user constructs for the purpose of presenting a question (e.g., a search inquiry) or command to the processing engine 104. In other cases, the query expresses the user's intent in a more indirect fashion. For example, the query may correspond to a portion of a document that the user is creating or viewing, and/or an aspect of an environment in which the user is currently operating. In other cases, the query corresponds to a combination of linguistic content, some of which directly expresses the user's intent and some of which indirectly expresses the user's intent.

The processing engine 104 may interact with content items 110 (e.g., documents, ads, etc.) in one or more data stores 112. In one case, the data store(s) 112 may represent a single repository of the content items 110. The single repository of content items 110 can be provided at the same physical site as the processing engine 104 or at a different physical site. In another case, the data store(s) 112 may represent a distributed repository of the content items 110. For example, the data store(s) 112 may represent content items provided by different physical sites which are accessible via the Internet.

The processing engine 104 itself may include at least a user interface component 114, an interpretation component 116, and a response-generating component 118. The user interface component 114 provides one or more user interface presentations through which the user may interact with the processing engine 104. For example, the user interface component 114 can provide one or more user interface presentations through which a user may provide an input linguistic item (e.g., a query) to the processing engine 104. The user interface component 114 may also provide one or more user interface presentations for conveying the output result items generated by the response-generating component 118 to the user device 106. In one implementation, the user device 106 may interact with any of these user interface presentations via a local browser program, such as INTERNET EXPLORER provided by MICRROSOFT CORPORATION of Redmond, Wash.

The interpretation component 116 processes the input content item (and/or each candidate item) to generate interpretation results. To perform this task, the interpretation component 116 leverages one or more instances of a semantic transformation component. Each instance of the semantic component, in turn, relies on a deep-structured neural network (DNN) 120. Subsection A.2 (below) provides illustrative details regarding one implementation of the DNN 120. Subsection A.3 (below) provides illustrative details regarding different ways in which the interpretation component 116 can apply one or more instances of the DNN 120. Subsection A.4 (below) provides illustrative details regarding one way to train the DNN 120. As a preview to Subsection A.4, a training system (not shown in FIG. 1) trains the DNN 120 based on a corpus of click-through data. The use of click-through data is predicated on the assumption that the significant parts of linguistic items (e.g., corresponding to dominant intents and entity names, etc.) enable good predictions of the users' click behavior; inversely, having a good model of the users' click behavior provides an effective mechanism for identifying the significant parts of linguistic items.

The response-generating component 118 generates one or more result items based on the interpretation results provided by the interpretation component 116. In the context of a search engine, the response-generating component 118 may generate a search page that provides a list of relevant documents that have been deemed to be pertinent to an input query. In another case, the response-generating component 118 can retrieve additional information regarding the user's input linguistic item, and supplement the input linguistic item with that additional information, e.g., by retrieving and presenting contact information associated with an entity name that appears in a document description. In the context of an advertisement-serving engine, the response-generating component 118 can generate an output presentation which embeds one or more advertisements that have been determined to be relevant to an input query. In the context of a personal digital assistant, the response-generating component 118 can provide whatever response(s) that have been deemed to be pertinent to an input question or command.

Figure 2:
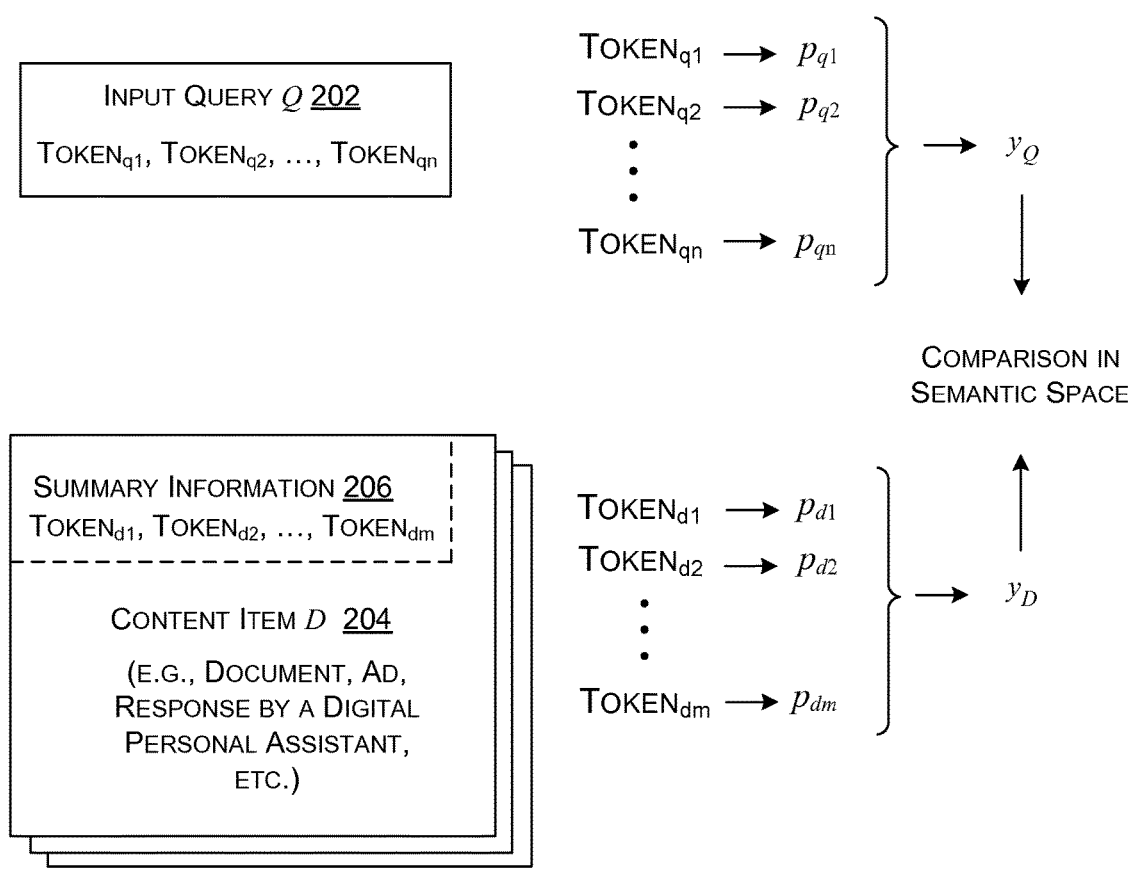
FIG. 2 summarizes one way in which the system of FIG. 1 can determine the relevance of a query to a candidate content item.

FIG. 2 provides a high-level description of one manner of operation of the interpretation component 116 of FIG. 1. In this case, a user submits a query Q 202 having n query tokens $\{token_{q1}, token_{q2}, \ldots, token_{qn}\}$. The interpretation component 116 compares the query Q 202 against a plurality of content items, including a content item D 204. In one implementation, the content item D 204 is represented by summary information 206, and that summary information 206 includes m item tokens $\{token_{d1}, token_{d2}, \ldots, token_{dm}\}$. For example, the content item D 204 may represent a document, and the summary information 206 may correspond to the title of the document. Or the summary information 206 may correspond to a search snippet that is associated with the document, as generated by a search engine. In other example, the content item may correspond to an advertisement, and the summary information 206 may correspond to descriptive detail associated with the advertisement, a title associated with the advertisement, and/or bidded keyword information associated with the advertisement, etc.

In the implementation of FIG. 2, the interpretation component 116 uses the DNN 120 to generate probability information associated with the input query Q 202 and probability information associated with the summary information 206. In the case of the input query Q 202, the probability information provides probability measures $\{p_{q1}, p_{q2}, \ldots, p_{qn}\}$ associated with the respective query tokens. In the case of the summary information 206, the probability information provides probability measures $\{p_{d1}, p_{d2}, \ldots, p_{dm}\}$ associated with the respective item tokens of the summary information 206. Each probability measure associated with a query token describes the relative importance of the query token, with respect to an extent to which the query token contributes to an underlying meaning associated with the query Q 202. Similarly, each probability measure associated with an item token describes the relative importance of the item token, with respect to an extent to which the item token contributes to an underlying meaning of the content item D 204. In each case, the probability information therefore provides a way of discriminating between noisy parts of a linguistic item, relative to more meaningful parts of the linguistic item.

The interpretation component 116 can leverage the probability information in different ways. In one approach, the interpretation component 116 can generate a query concept vector $y_Q$ that is associated with the query Q 202, based, in part, on the probability information associated with the query Q 202. The query concept vector $y_Q$ expresses the underlying meaning of the query Q as a whole within a semantic vector space. Similarly, the interpretation component 116 can generate an item concept vector $y_D$ that is associated with the content item D 204 (or more specifically, that is associated with the summary information 206), based, in part, on the probability information associated with the content item D 204. The item concept vector $y_D$ reflects the underlying meaning of the content item D 204 in the semantic vector space. The next subsection provides further details regarding the computation of probability information and concept vectors.

In one manner of operation, the interpretation component 116 can then generate a similarity measure (e.g., a cosine similarity measure) between the query concept vector $y_Q$ and the item concept vector $y_D$. The similarity measure corresponds to one factor which indicates an extent to which the content item D 204 is relevant to the query Q 202.

Note that the example of FIG. 2 represents just one of many ways that the processing engine 104 can leverage probability information and concept vectors; Subsection A.3 (below) provides additional examples of the ways in which the processing engine 104 can rely on the probability information and concept vectors.

Figure 3:
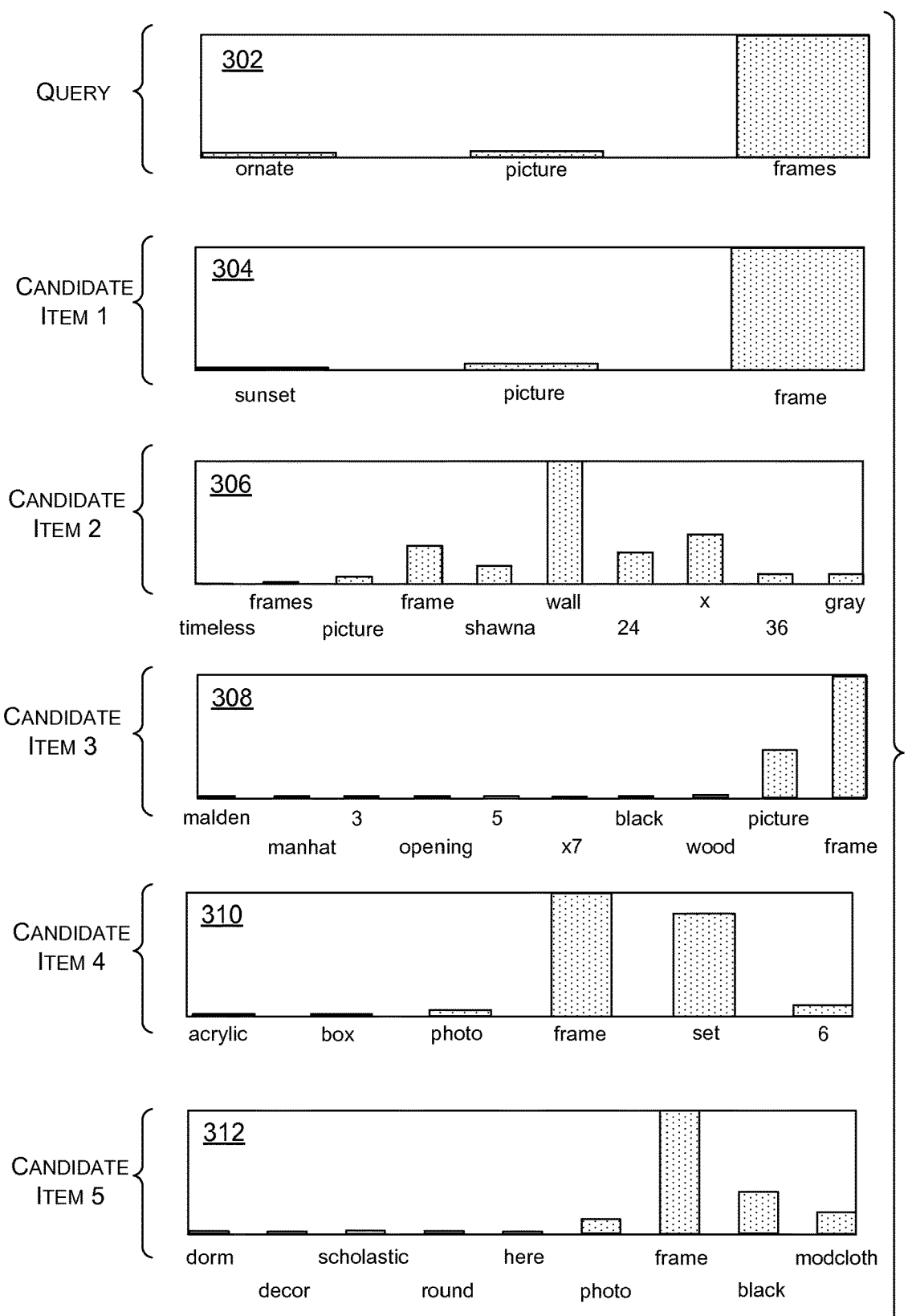
FIG. 3 shows illustrative interpretation results provided by the system of FIG. 1.

FIG. 3 shows a more concrete example of the output of the interpretation component 116. In this case, presume that the user is performing an online search, with the objective of purchasing a picture frame that is characterized as being ornate. To this end, assume that the user submits a query Q having three query tokens, "ornate picture frames." The interpretation component 116 computes a probability measure associated with each query token, reflecting the relative importance of that query token in conveying the intent of the query Q. A plot 302 shows three bars associated with the three respective query tokens. The height of each bar reflects the value of a probability measure associated with a corresponding query token. In this merely illustrative example, the plot 302 reveals that the word "frames" is relatively important in conveying the presumed underlying meaning of the query Q, while the words "ornate" and "picture" are considerably less important.

More specifically, in some cases, the tokens having relatively high probability measures express the dominant intent associated with the query Q. Here, the user's intent in performing the search is to find picture frames, and the word "frames" does in fact reflect the intent of the user, compared to the word "ornate" (for example).

FIG. 3 also provides other plots (304, 306, 308, 310, 312) associated with five candidate content items (e.g., documents, ads, etc.) that have been determined to be relevant to the query Q. The height of each bar in each plot reflects the value of a probability measure associated with a corresponding item token. Note that some of the content items are relatively verbose. For instance, the content item No. 3 (associated with the plot 308) includes ten item tokens. The probability measures help identify the item tokens in content item No. 3 which most strongly convey the presumed meaning associated with content item No. 3. Here, the most important item tokens correspond to "picture" and "frame."

Stated in the negative, the probability measures help filter out noise associated with the collection of item tokens, e.g., by discounting the significance of words like "x7," "black," "wood," etc. in content item No. 3. However, note that a word that is considered noise with respect to one linguistic item may have a more prominent role with respect to another content item. For example, the word "black" in the content item No. 5 has a greater relative probability measure compared to the word "black" in the context of item No. 3. In part, the interpretation component 116 may assign different assessments to the same word in different linguistic items because the word may play a different role in the different respective linguistic items. To achieve this result, the DNN 120 includes processing which takes into account the context of each word in a linguistic item, with respect to other words in the linguistic item.

In many cases, the item tokens having relatively high probability measures in a candidate content item may describe the primary entity associated with the candidate content item. For example, the word "frame" has a relative high score in most of the plots (304-312) of FIG. 3. This result indicates that these content items likely describe picture frames, rather than using the word "frames" in some incidental manner.

The interpretation component 116 can leverage the information conveyed in FIG. 3 by comparing the most significant query tokens in the query Q with the most significant item tokens associated with each content item D. In doing so, the interpretation component 116 can identify content items that are truly relevant to the query Q. Stated in the negative, the interpretation component 116 can leverage the probability information to discount the influence of noisy low-value tokens in the content items.

In conclusion to this introduction subsection, the system 102 provides various benefits. For instance, by virtue of its discrimination between important and less important parts of linguistic items, the system 102 provides the most relevant content items to a user upon the user's submission of a query. This characteristic results in good user experience because the user is not deluged with irrelevant content items. Further, the system 102 quickly provides the most relevant content items, which contributes to the user's efficiency (e.g., by reducing the number of keystrokes that the user is expected to perform to find relevant content items). This characteristic also contributes to the efficient use of the processing engine's communication and processing resources. That is, by virtue of the fact that the user is quickly given relevant content items, the processing engine 104 does not need to expend resources that would otherwise be required to conduct an extended search session.

Finally, the system 102 may increase the profitability of the advertisers and whatever entity administers the processing engine 104. The advertisers benefit because they may sell more products and services through the improved placement of their ads. The entity which administers the processing engine 104 benefits because an increased impression rate and/or click-through rate may increase the fees paid by the advertisers to the entity. An "impression" refers to an occasion in which the processing engine 104 presents an ad to a user for the user's consideration. A "click" refers to an occasion in which a user clicks on or otherwise selects an ad that is presented to him or her.

A.2. Illustrative Construction of a Semantic Transformation Component

Figure 4:
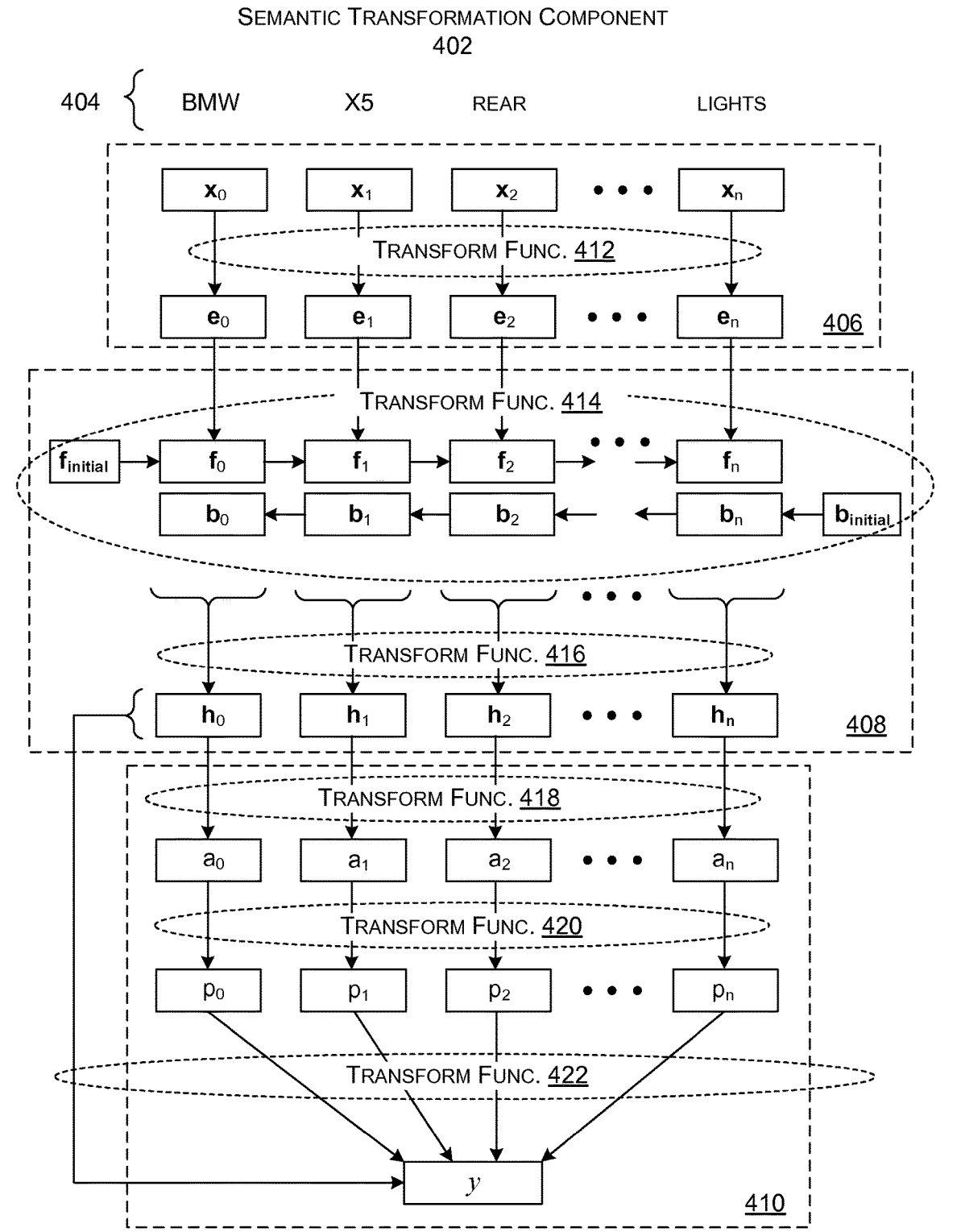
FIG. 4 shows a semantic transformation component that is built using a deep-structured neural network.

FIG. 4 shows one instance of a semantic transformation component 402. The semantic transformation component 402 generates probability information and (optionally) a concept vector y associated with an input linguistic item 404, "BMW X5 rear lights." The input linguistic item 404 may correspond to a query Q or summary information associated with a candidate content item D, or some other linguistic information.

The semantic transformation component 402 generates the probability information and the query y using an instance of the deep-structured neural network (DNN) 120. The DNN 120 can be conceptualized as being composed of a plurality of successive layers of memory units (represented as rows of boxes in FIG. 4) and transformation functionality (represented as dashed-lined ovals in FIG. 4). Generally, an instance of transformation functionality may receive input values from the memory units in a preceding layer of the DNN 120, perform computations on the values to generate output values, and store the output values in a subsequent layer of the DNN 120. Note that any single output value may depend on plural input values. More generally, note that FIG. 4 shows a specific number of layers by way of illustration, not limitation; other implementations of the DNN 120 can employ additional layers or fewer layers compared to the example of FIG. 4.

The illustrative DNN 120 shown in FIG. 4 includes at least three parts (406, 408, 410) which perform different respective functions. A first part 406 begins by expressing the tokens (e.g., words) associated with the input linguistic item 404 as a series of input word vectors $\{x_0, x_1, \ldots, x_n\}$, where n represents the total number of tokens in the input linguistic item. For example, the first part 406 can express each word in the input linguistic item 404 as a one-hot vector. A one-hot vector has a series of dimensions associated with respective words in a vocabulary V of size |V|. The one-hot vector has a value of 1 for that dimension of the vector that is associated with the specific word that it represents. All remaining dimensions in the one-hot vector are set to 0. (The roles of 0 and 1 can be alternatively reversed, such that 0 indicates the presence of a word and 1 indicates the absence of the word.)

In another implementation, the first part 406 can use a word hashing technique to generate each word vector. For example, consider the word "lights" in the input linguistic item 404. The word hashing technique can form a letter-trigram representation of that word by moving a three-letter window across the word to produce a succession of three-letter character groupings, e.g., to produce "lig", "igh", an "ght". The word hashing technique then forms a letter-trigram word vector for each word that expresses the particular letter-trigrams that appear in the word. More specifically, each letter-trigram word vector has a number of dimensions corresponding to the total number of three-letter sequences that may appear in a particular natural language, such as English. The word hashing technique forms a letter-trigram word vector for a particular word by counting the number of letter-trigrams of each particular type that appear in the word, and then setting values, at corresponding dimensions in the vector, to reflect those counts. For example, the word "light" would include a 1 value entry for each of the trigrams described above ("lig", "igh", and "ght"), and a 0 value entry for all other dimensions, or vice versa. If a particular letter-trigram appears more than once in a particular word, then the count for that dimension would reflect how many times that letter-trigram appears in the word.

Next, optional transformation functionality 412 transforms each word vector $x_i$ into a corresponding embedding vector $e_i$, to produce a collection of embedding vectors $\{e_1, e_2, \ldots, e_n\}$. In one case, for instance, the transformation functionality 412 uses a linear transformation to perform this conversion:

$$e_i = W_{emb} x_i \quad (1)$$

In this equation, $W_{emb}$ represents a word embedding matrix to be learned in a preliminary training procedure (to be described in Subsection A.4). It has dimensions of d×|V|, where |V| is the size of the vocabulary and d is the dimension of each embedding vector $e_i$. Note that the linear transformation described in Equation (1) is merely one example; other implementations can use other transformations to convert the word vectors $x_i$ into the embedding vectors $e_i$.

A second part 408 of the DNN 120 transforms the collection of embedding vectors $\{e_1, e_2, \ldots, e_n\}$ into a collection of state vectors $\{h_1, h_2, \ldots, h_n\}$. Each state vector $h_i$ expresses the context of a token in the input linguistic item 404 with respect to other tokens in the input linguistic item 404. In other words, each state vector $h_i$ associated with a particular token $token_i$ in the input linguistic item 404 reflects information about neighboring tokens in the input linguistic item 404. In one implementation, each state vector $h_i$ has a dimensionality c, which may be different than (e.g., smaller than) the dimensionality d of its corresponding embedding vector $e_i$, or the same.

The second part 408 generates the state vectors $\{h_1, h_2, \ldots, h_n\}$ using a recurrent neural network. In the specific non-limiting case shown in FIG. 4, the second part 408 generates the state vectors $\{h_1, h_2, \ldots, h_n\}$ using a bi-directional neural network. The bi-directional neural network includes forward-sequence processing and back-sequence processing. In the forward-sequence processing, with respect to a given word in the input linguistic item 404, the influence of the preceding word in the input linguistic item 404 is taken into account. In the backward-sequence processing, the influence of the subsequent word in the input linguistic item 404 is taken into account.

The transformation functionality 414 represents whatever transformation operations that the second part 408 uses to convert the embedding vectors into a collection forward-sequence vectors $\{f_1, f_2, \ldots, f_n\}$ and a collection of backward-sequence vectors $\{b_1, b_2, \ldots, b_n\}$. In one non-limiting implementation, the transformation functionality 414 uses the following two equations to compute each $f_i$ and $b_i$, respectively:

$$f_i = g(W_{xf} e_i + W_{ff} f_{i-1}) \quad (2), \text{ and}$$

$$b_i = g(W_{xb} e_i + W_{bb} b_{i+1}) \quad (3)$$

In Equation (2), note that the value of a forward-sequence vector $f_i$ for $token_i$ is based on the embedding vector $e_i$ for token$_i$ together with the forward-sequence vector f$_{i-1}$ associated with the preceding token (token$_{i-1}$) in the input linguistic item 404. In Equation (3), the value of a backward-sequence vector b$_i$ for token$_i$ is based on the embedding vector e$_i$ for token$_i$, together with the backward-sequence vector b$_{i+1}$ associated with the subsequent token (token$_{i+1}$) in the input linguistic item 404. The forward-sequence vector f$_{initial}$ shown in FIG. 4, preceding the forward-sequence vector f$_0$, provides initialization values, such as a series of 0 values. Similarly, the back-sequence vector b$_{initial}$, subsequent to the backward-sequence vector b$_n$, provides initialization values, such as a series of 0 values. The symbols W$_{xf}$, W$_{ff}$, W$_{xb}$, and W$_{bb}$ represent respective matrices of weighting values to be learned in the preliminary training procedure. The function symbol g( ) represents some environment-specific activation function, such as the tan h function, a rectifier function (f(x)=max(0, x)), etc.

In other cases, the second part 408 uses another type of recurrent neural network to capture context information, compared to the above-described bi-directional recurrent neural network. For example, in another implementation, the second part 408 can use just the above-described forward-sequence processing (without the backward-sequence processing), or just the backward-sequence processing (without the forward-sequence processing). In yet another implementation, the second part 408 can use a recurrent neural network that incorporates long short-term memory (LSTM) processing. LSTM processing involves capturing values in memory cells. An input gate, forget gate, and output gate cooperatively manage the manner in which each memory cell captures, retains, and propagates a stored value.

The transformation functionality 416 next generates the collection of state vectors {h$_1$, h$_2$, . . . , h$_n$} based on the collection of forward-sequence vectors {f$_1$, f$_2$, . . . , f$_n$} and backward-sequence vectors {b$_1$, b$_2$, . . . , b$_n$}. The transformation functionality 416 can use different approaches to perform this computation. In one case, the transformation functionality 416 concatenates each f$_i$ with its corresponding b$_i$ to produce h$_i$. In another case, the transformation functionality 416 adds f$_i$ and b$_i$ together to produce h$_i$, and so on. Each of the vectors f$_i$, b$_i$, and h$_i$ has a dimensionality of c.

A third part 410 of the DNN 120 transforms the state vectors {h$_1$, h$_2$, . . . , h$_n$} into a collection of scalar probability measures {p$_1$, p$_2$, . . . , p$_n$} and (optionally) a single concept vector y. In one approach, transformation functionality 418 first uses any neural network (characterized by a weighting matrix W$_{att}$, to be learned) to convert each state vector h$_i$ into a corresponding scalar value a$_i$, where a$_i$≥0. Next, transformation functionality 420 generates each probability measure p$_i$ by normalizing a$_i$, e.g., using the following equation:

$$p_i = \frac{\exp(a_i)}{\Sigma_1^n \exp(a_i)}. \qquad (4)$$

The values of p$_i$ for all of the tokens in the input linguistic item 404 sum to 1, where each p$_i$>0. More generally stated, the value of p$_i$, which ultimately depends on h$_i$, reflects the relative importance of a token in the input linguistic item 404, corresponding to the extent to which it contributes to the underlying meaning of the input linguistic item 404 as a whole. The probability information {p$_1$, p$_2$, . . . , p$_n$} also identifies low-value noisy words in the input linguistic item 404. In this sense, the third part 410 of the DNN 120 can also be regarded as a noise-identification mechanism. In another implementation, each p$_i$ can be formed using Equation (4), but by replacing each exp(a$_i$) with a$_i$.

Finally, transformation functionality 422 optionally generates the concept vector y based on some function of the probability measures {p$_1$, p$_2$, . . . , p$_n$} and the state vectors {h$_1$, h$_2$, . . . , h$_n$}. For instance, in one non-limiting implementation, the transformation functionality 422 generates the concept vector y as a weighted sum of the state vectors, e.g. as given by the following illustrative equation:

$$y = \sum_{i=1}^{n} p_i h_i. \qquad (5)$$

The concept vector y has a dimensionality of c and expresses the underlying meaning of the input linguistic item 404 as a whole within a semantic vector space. Vectors that are similar in the semantic vector space represent similar concepts.

A.3. Illustrative Uses of the Semantic Transformation Component

Figure 5:
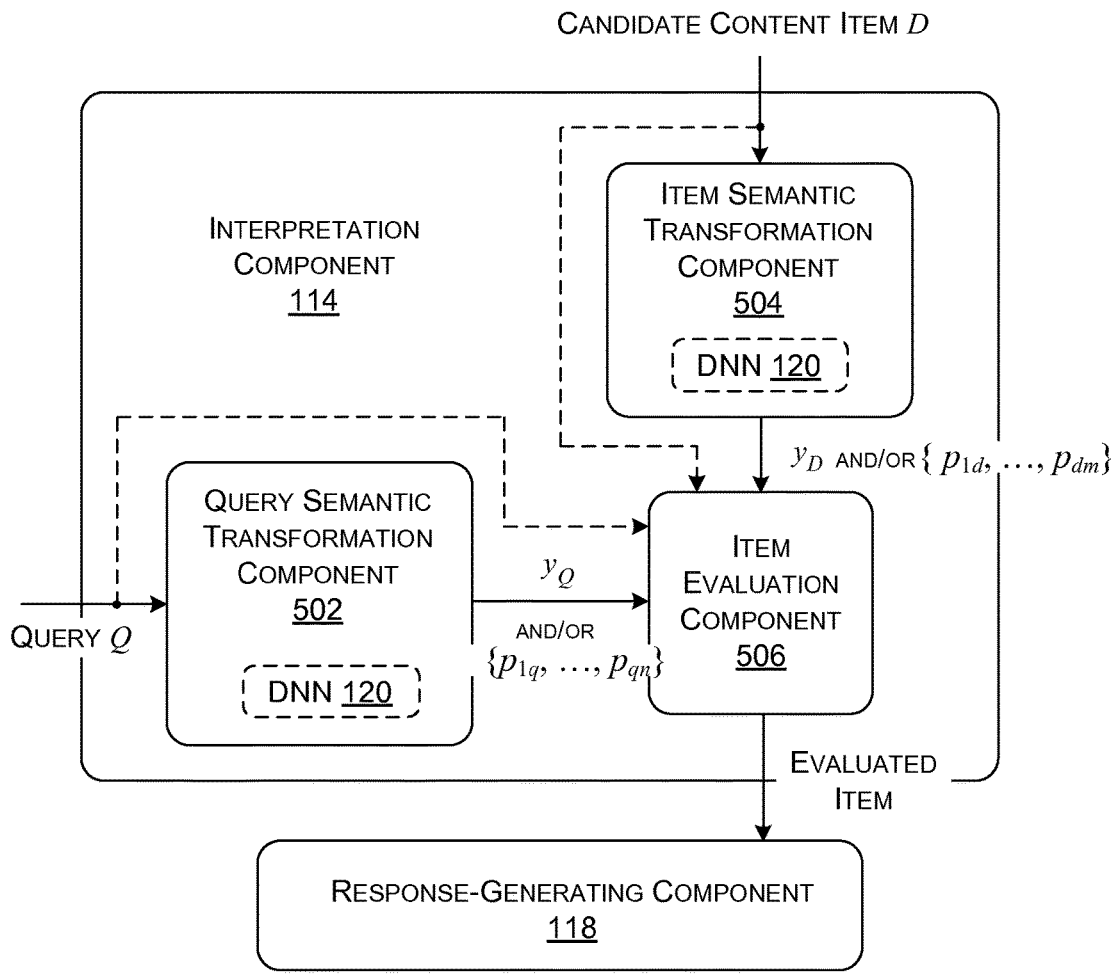
FIG. 5 shows one implementation of an interpretation component, which is a part of the system of FIG. 1.

FIG. 5 shows one application of the type of semantic transformation component 402 described above in Subsection A.2. In this case, the interpretation component 116 includes a query semantic transformation component 502 which uses an instance of the deep-structured neural network (DNN) 120 to generate query probability information {p$_{q1}$, p$_{q2}$, . . . , p$_{qn}$} associated with the individual query tokens in a query Q, and a concept vector y$_Q$. The interpretation component 116 can optionally also include an item semantic transformation component 504 which uses an instance of the DNN 120 to generate item probability information {p$_{d1}$, p$_{d2}$, . . . , p$_{dm}$} associated with the individual item tokens in a candidate content item D, together with an item concept vector y$_D$. The DNN 120 used by the query semantic transformation component 502 and the DNN 120 used by the item semantic transformation component 504 use the same model (e.g., use the same parameter values produced in the preliminary training operation). An item evaluation component 506 determines the relevance of the candidate content item D to the query Q based on any of the above-cited information computed by the query semantic transformation component 502 and/or the item semantic transformation component 504.

Figure 6:
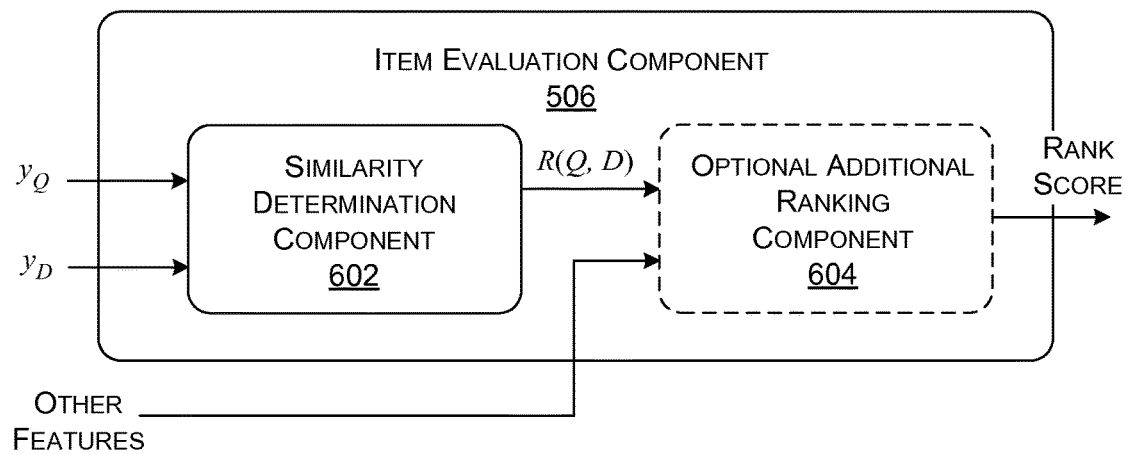
FIG. 6 shows one implementation of an item evaluation component, which is a part of the interpretation component of FIG. 5.

For instance, FIG. 6 shows one implementation of the item evaluation component 506. Here, a similarity determination component 602 determines a similarity measure R (Q, D) that reflects the similarity between the query concept vector y$_Q$ and the item concept vector y$_D$ in semantic vector space. In one implementation, the similarity determination component 602 can perform this determination using a cosine similarity measure, as follows:

$$R(Q, D) = \text{cosine}(y_Q, y_D) = \frac{y_Q^T y_D}{\|y_Q\|\|y_D\|}. \qquad (6)$$

In one implementation, the item evaluation component 506 can judge the similarity between the query Q and the candidate content item D based on the similarity measure generated by the similarity determination component 602 by itself. In another implementation, the item evaluation component 506 can provide a ranking component 604 which assigns a rank value to the candidate content item based on the similarity measure R (Q, D) output from the similarity determination component 602, together with one or more other feature values. These other feature values can describe any other aspect(s) of the query Q, any other aspect(s) of the candidate content item D, and/or any other aspects of the relationship between the query Q and the candidate content item D, etc. In one implementation, the ranking component 604 may use a machine-trained model of any type to perform its ranking operation.

Figure 7:
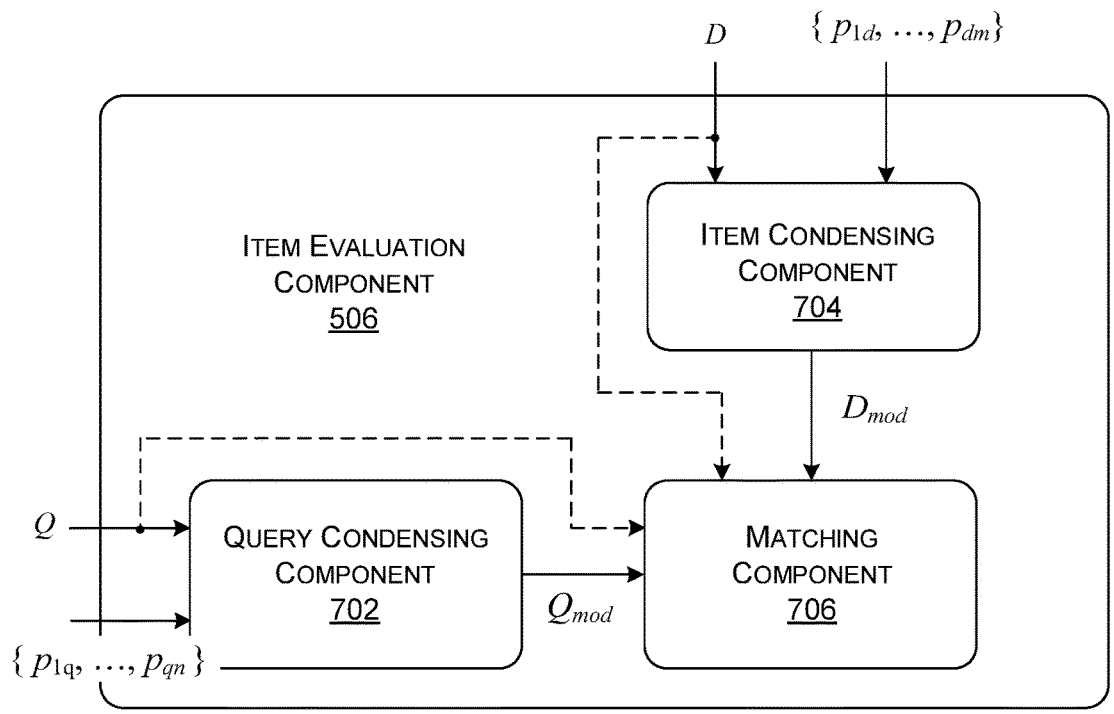
FIG. 7 shows another implementation of the item evaluation component of FIG. 5.

FIG. 7 shows another implementation of the item evaluation component 506. Here, a query condensing component 702 can use the query probability information $\{p_{q1}, p_{q2}, \ldots, p_{qn}\}$ associated with the query Q as originally supplied by the user to produce a shortened query $Q_{mod}$. For instance, the query condensing component 702 can retain only those query tokens having probability measures above a prescribed environment-specific threshold. Similarly, an item condensing component 704 can use the item probability information $\{p_{d1}, p_{d2}, \ldots, p_{dm}\}$ associated with a candidate content item D to produce a shortened content item $D_{mod}$. For instance, the item condensing component 704 can retain only those item tokens having probability measures above a prescribed environment-specific threshold. A matching component 706 can use any matching logic to determine the similarity between the modified query $Q_{mod}$ and the modified candidate content item $D_{mod}$, such as by using a machine-trained ranking model. Note that the implementation of FIG. 7 optionally does not make use of the query concept vector $y_Q$ and the item concept vector $y_D$ (although it could, alternatively).

The implementations of FIGS. 5-7 can be varied in different ways. For example, in FIG. 5, the interpretation component 116 can omit the item semantic transformation component 504. In that case, the item evaluation component 506 can use just the query probability information $\{p_{q1}, p_{q2}, \ldots, p_{qn}\}$ and/or the query concept vector $y_Q$ to determine the relevance of the candidate content item D to the query, e.g., without the use of item probability information $\{p_{d1}, p_{d2}, \ldots, p_{dm}\}$ and the item concept vector $y_D$. For instance, the ranking component 604 of FIG. 6 can generate a rank score for the candidate content item D based on the query concept vector $y_Q$ (and other optional feature values), but not based on the item concept vector $y_D$. Or the query condensing component 702 shown in FIG. 7 can use the query probability information $\{p_{q1}, p_{q2}, \ldots, p_{qn}\}$ to shorten the query Q, without also shortening the candidate content item using the item condensing component 704.

In other cases, the interpretation component 116 can use the item semantic transformation component 504 without using the query semantic transformation component 502. For instance, the ranking component 604 of FIG. 6 can generate a rank score for the candidate content item D based on the item concept vector $y_D$ (and other optional feature values), but not based on the query concept vector $y_Q$. Or the item condensing component 704 shown in FIG. 7 can use the item probability information $\{p_{d1}, p_{d2}, \ldots, p_{dm}\}$ to shorten the candidate content item D, without also shortening the query using the query condensing component 702.

Figure 8:
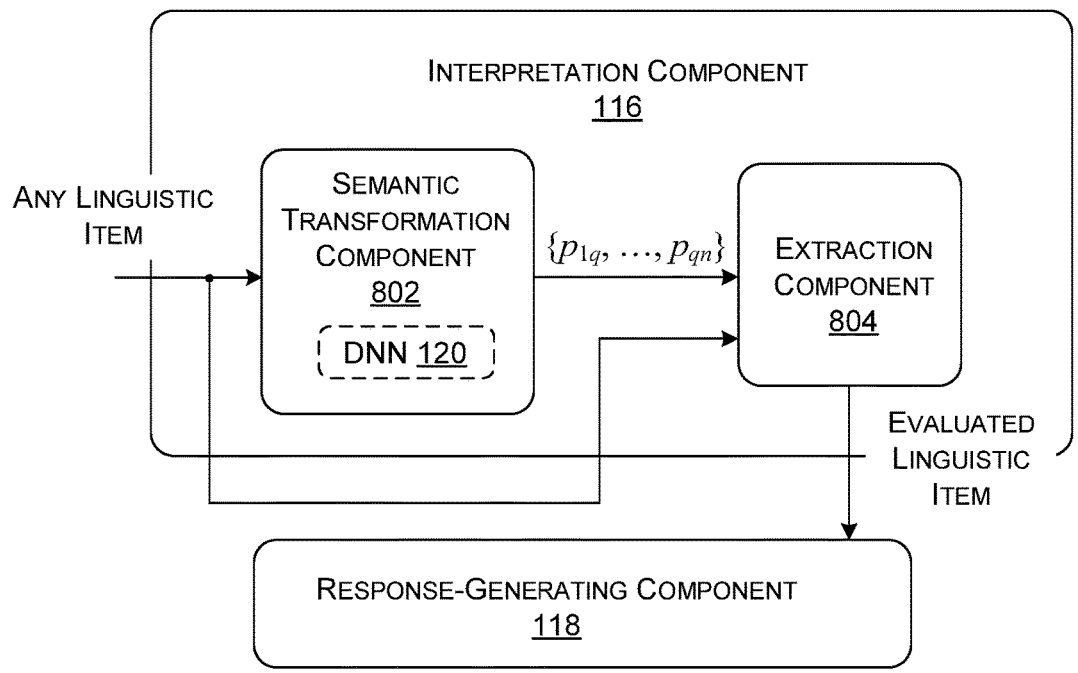
FIG. 8 shows another implementation of the interpretation component of FIG. 1.

FIG. 8 shows another implementation of the interpretation component 116 of FIG. 1. In that case, a semantic transformation 802 generates at least probability information $\{p_1, p_2, \ldots, p_n\}$ associated with an input linguistic item of any type, such as a query, document, etc. An extraction component 804 uses the probability information $\{p_1, p_2, \ldots, p_n\}$ to identify the token or tokens having relatively high probability measures, based on any environment-specific threshold and/or rule(s). The identified token(s) may correspond to the dominant intent of a query, an entity name in a product description, etc.

The response-generating component 118 can use the extracted information (provided by the extraction component 804) in different ways. For example, the response-generating component 118 can produce a user interface presentation which highlights entity names in a document, etc. In other words, the implementation of FIG. 8 does not necessarily involve identifying a relevant content item; it only involves identifying relevant parts of the user's input linguistic item and communicating those relevant parts to the user.

Figure 9:
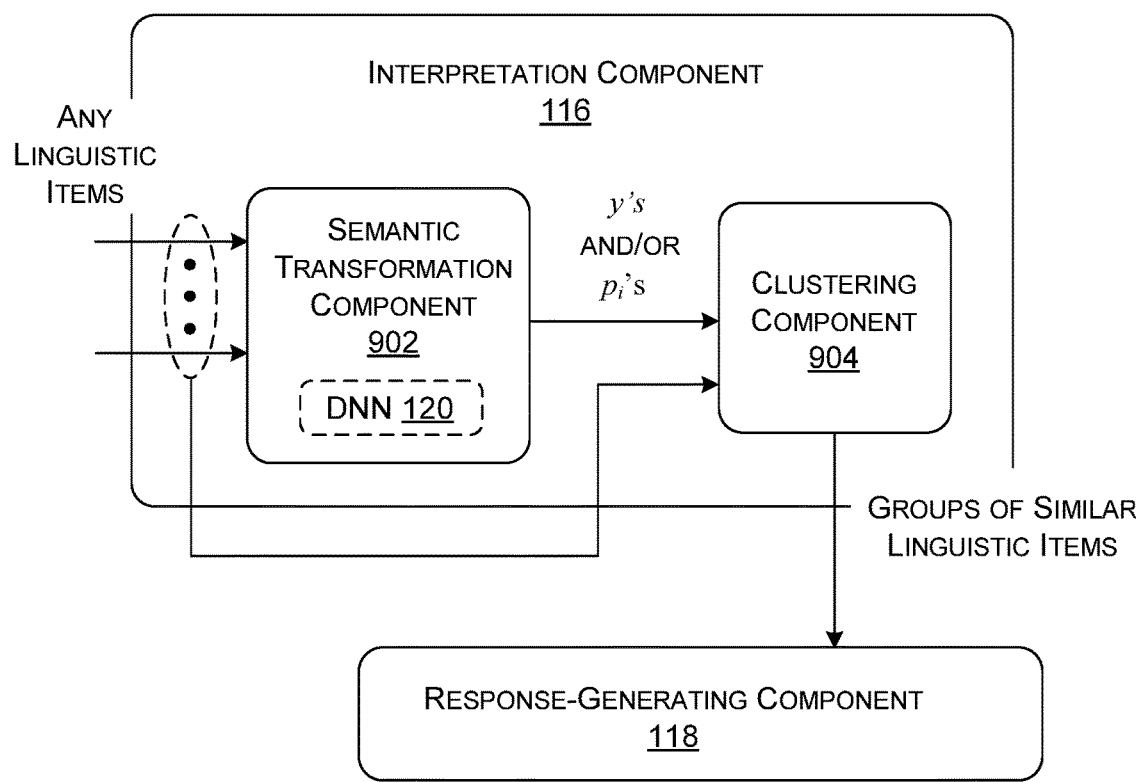
FIG. 9 shows another implementation of the interpretation component of FIG. 1.

FIG. 9 shows yet another implementation of the interpretation component 116. In this case, a semantic transformation component 902 receives a plurality of linguistic items, such as a plurality of document snippets. In one case, the user may manually upload these linguistic items. In another case, the user may provide an instruction which identifies the locations of the linguistic items. In response, the semantic transformation component 902 can generate probability information and/or a concept vector associated with each linguistic item. A clustering component 904 can then form subsets of similar linguistic items based on the output of the semantic transformation component 902. For instance, the clustering component 904 can use a clustering algorithm of any type to form clusters of similar concept vectors in the semantic vector space.

The response-generating component 118 can use the clustered linguistic items (provided by the clustering component 904) in different ways. For example, the response-generating component 118 can produce a user interface presentation which identifies different groups of linguistic items. Or the response-generating component 118 can store the different groups of linguistic items in different respective storage locations, perform different processing on the different groups of linguistic items, etc.

The above-identified applications of semantic transformation components are cited by way of illustration, not limitation. Other implementations can leverage one or more semantic transformation components in other ways.

A.4. Illustrative Training of the Neural Network

Figure 10:
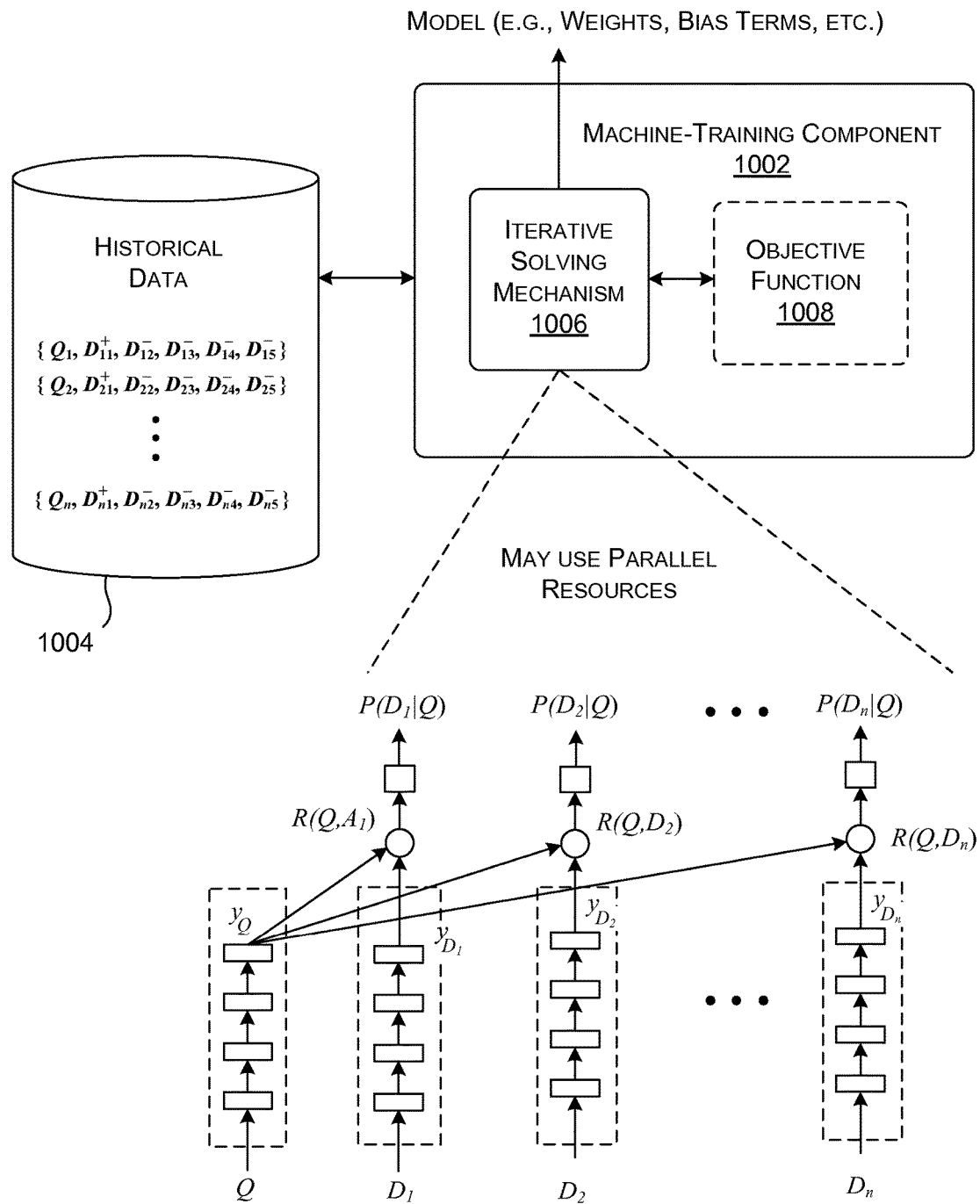
FIG. 10 shows training functionality for producing the deep-structured neural network used by the semantic transformation component of FIG. 4.

FIG. 10 shows one implementation of a training system 1002 that can be used to produce a model associated with the deep-structured neural network 120. The model, denoted by the symbol Λ, represents the collection of weighting matrices ($W_{emb}$, $W_{xf}$, $W_{ff}$, $W_{xb}$, $W_{bb}$, and $W_{att}$) described in Subsection A.2 (optionally together with biasing values, if these biasing values are part of a particular model).

The training system 1002 generates the model Λ using a weakly supervised approach, based on historical data in a data store 1004. In one implementation, the historical data represents click-through data, obtained by a collection component (not shown) from the data stores maintained by a search engine. The click-through data generally describes queries submitted by actual users over some span of time, together with an indication of documents that the users clicked on (and did not click on) after submitting those queries. Here, the term "click" is intended to have broad connotation. The term click may describe the case in which a user literally selects an entry within a presentation of search results, e.g., using a mouse device to click on the entry, or using some other mechanism to choose the entry. In other cases, the term click describes the case in which a user exhibits interest in a document without expressly selecting the document, such as by hovering over an entry associated with the document, or gazing at the document (which can be detected by eye gaze recognition technology), and so on.

In whatever manner formed, the click-through data encompasses a plurality of instances of training data, each constituting a training example. Each example includes a query (Q), a document (D$^+$) that a user has selected in response to the query, and at least one document (D$^-$) that the user did not select in response to the query. FIG. 10 shows the particular case in which a training example includes four non-clicked documents $\{D_2^-, D_3^-, D_4^-, D_5^-\}$, but a training example can include any number of such non-clicked documents.

In one case, the data collection module can mine negative click information from the archives of the search engine. In that case, a non-clicked document (D$^-$) of a training example may correspond to an actual document that was offered to a user in response to the user's submission of a query Q, but which the user declined to select. In other cases, the collection component can randomly select any document from a corpus of documents; that document is then treated as a presumed non-clicked document (D$^-$). This latter implementation represents an approximation because there is no requirement that the randomly selected document D$^-$ has actually been presented to the user in response to the query Q, and it typically will not have been presented to the user.

The training system 1002 operates by using an iterative solving mechanism 1006 to achieve an objective defined an objective function 1008 by iteratively changing the parameter values of the model Λ. When the iterative processing is finished, the final parameter values constitute the trained model Λ. The objective function 1008, in turn, mathematically expresses an aim which the model Λ seeks to achieve, when fully trained. In the present case, the objective function 1008 stipulates that the conditional likelihood of the clicked documents, given respective queries, is to be maximized, and the conditional likelihood of non-clicked documents, given the queries, is to be reduced. In other words, the objective function 1008 attempts to make the assessed relevance of clicked documents as high as possible, while simultaneously attempting to make the assessed relevance of non-clicked documents as low as possible.

More formally stated, note that the probability P (D|Q) of a relevant document (D$^+$) in a training subset, given a query Q, can be expressed as follows:

$$P(D^+ | Q) = \frac{\exp(\psi R_\Lambda(Q, D^+))}{\Sigma_{D' \in D} \exp(\psi R_\Lambda(Q, D'))}. \tag{7}$$

The term $R_\Lambda(Q, D^+)$ represents the similarity between Q and D$^+$ in the semantic vector space, for a given current selection of parameters associated with a model Λ. The term D represents the set of five documents in the training example, including D$^+$ and the four instances of D$^-$. The term $R_\Lambda(Q, D')$ represents the similarity between Q and one of the instances of D' in the training subset, in the semantic vector space. The symbol ψ represents an empirically-derived smoothing factor.

For the individual training example in Equation (7), the objective function 1008 expresses an aim to make R(Q, D$^+$) as high as possible, and each R(Q, D$^-$) as low as possible, to overall make P (D$^+$|Q) as high as possible, and each P (D$^-$|Q) as low as possible. Overall, the training system 1002 operates by minimizing the following loss equation:

$$L(\Lambda) = -\log \prod_{(Q, D^+)} P(D^+ | Q). \tag{8}$$

In one approach, the iterative solving mechanism 1006 uses a gradient-based numerical optimization algorithm to solve the above problem, such as a gradient descent technique. The iterative solving mechanism 1006, for instance, can apply the following update rule to perform the optimization:

$$\Lambda_t = \Lambda_{t-1} - \epsilon_t \frac{\partial L(\Lambda)}{\partial \Lambda} \bigg|_{\Lambda = \Lambda_{t-1}}. \tag{9}$$

Here, $\Lambda_t$ and $\Lambda_{t-1}$ are the models at the t$^{th}$ and t-1$^{th}$ iteration, respectively, and $\in_t$ is a learning rate parameter. From a high-level perspective, the iterative solving mechanism 1006 makes a large change in the model Λ whenever the model Λ is changing by a relatively large amount from iteration to iteration, and makes a smaller change in the model Λ whenever the model Λ is changing by a smaller amount.

The iterative solving mechanism 1006 operates in successive forward and backward phases of analysis until a desired degree of convergence is achieved, to generate the final set of parameter values defining the model Λ. The iterative solving mechanism can 1006 can also use various strategies to expedite its computations. For instance, the iterative solving mechanism 1006 can perform its computations in parallel batches to expedite the training operation. In addition, or alternatively, the iterative solving mechanism 1006 can use known techniques to dynamically adjust the learning rate during the training process. In addition, or alternatively, the iterative solving mechanism 1006 can make use of high-speed computation devices, such as graphical processing units (GPUs) to perform at least part of its computations.

B. Illustrative Processes

Figure 11:
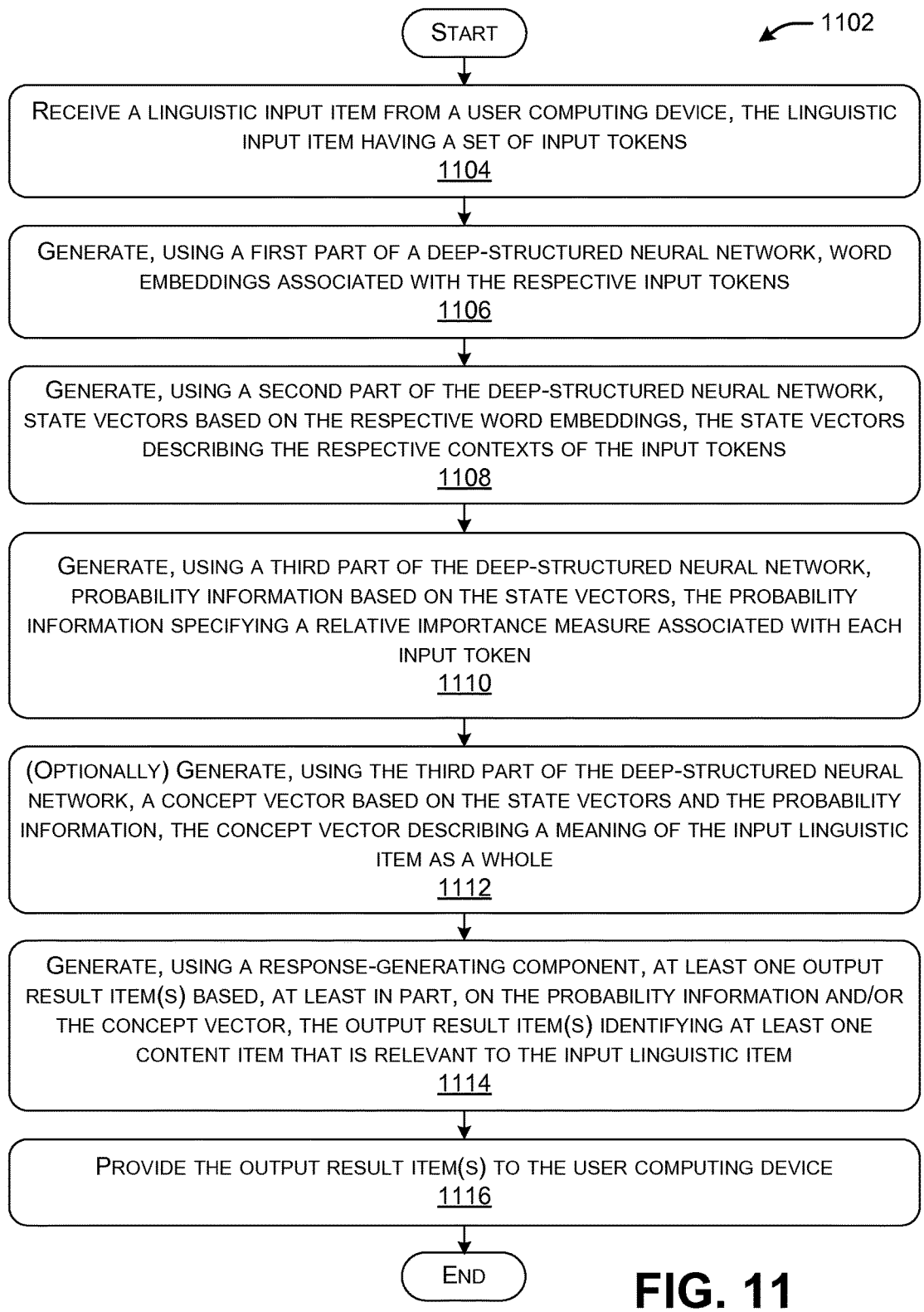
FIG. 11 shows a process that represents one manner of operation of the system of FIG. 1.
Figure 12:
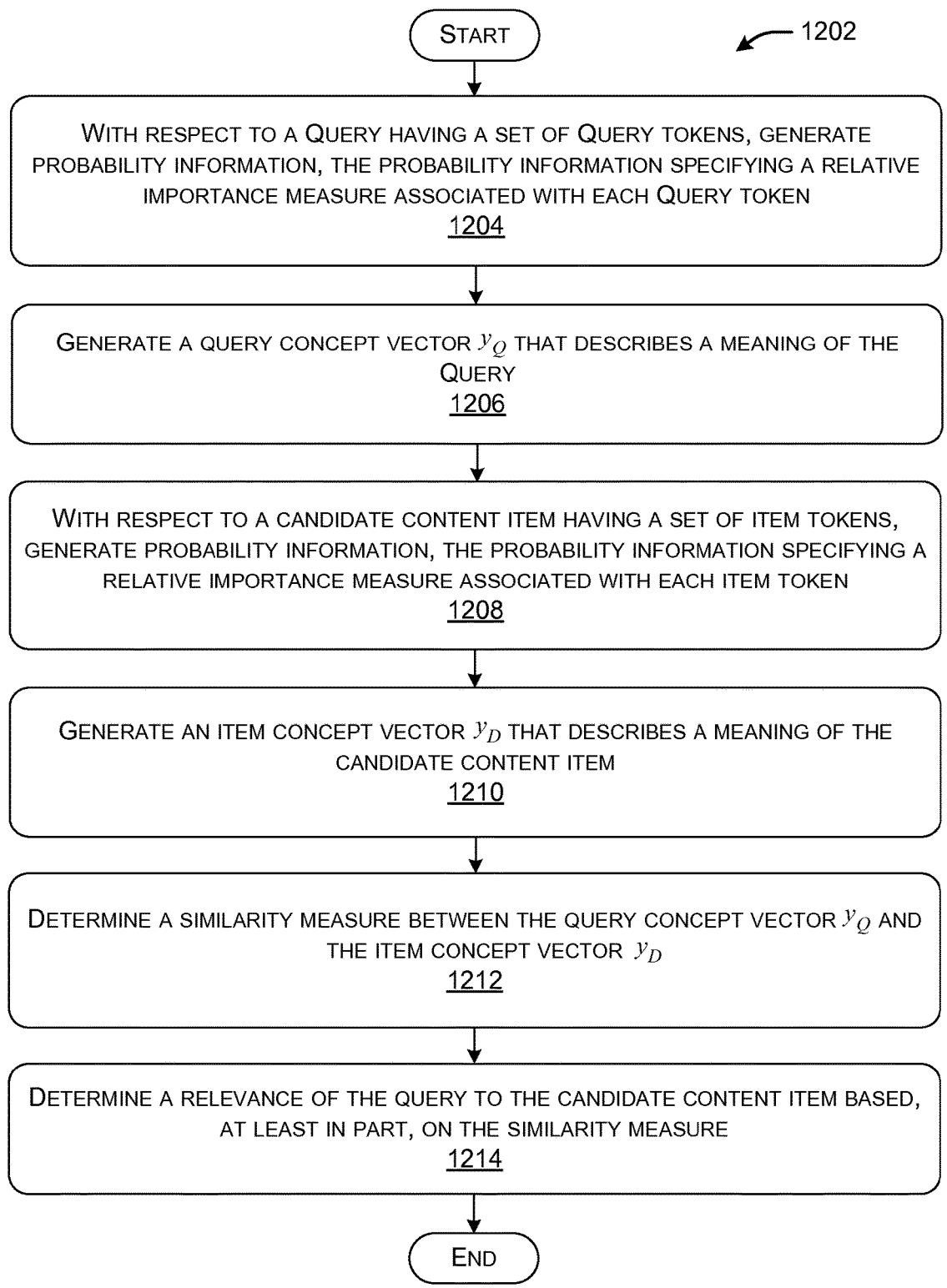
FIG. 12 shows a process that represents a more specific manner of operation of the system of FIG. 1, compared to the process of FIG. 11.

FIGS. 11 and 12 show processes that explain the operation of the system 102 of Section A in flowchart form. Since the principles underlying the operation of the system 102 have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

FIG. 11 shows a process 1102 that represents one manner of operation of the system 102 of FIG. 1. In block 1104, the processing engine 104 receives an input linguistic item from the user device 106. The input linguistic item has a set of input tokens. In block 1106, the processing engine 104 uses the first part 406 of the deep-structured neural network (DNN) 120 to generate word embeddings associated with the respective input tokens. In block 1108, the processing engine 104 uses the second part 408 of the DNN 120 to generate state vectors based on the respective word embeddings. The state vectors describe the respective contexts of the input tokens within the input linguistic item. In block 1110, the processing engine 104 uses the third part 410 of the DNN 120 to generate probability information based on the state vectors. The probability information specifies a relative importance measure associated with each input token that conveys an extent to which each input token contributes to an expression of an underlying meaning associated with the input linguistic item. In block 1112, the processing engine 104 optionally uses the third part 410 of the DNN 120 to also generate a concept vector based on the state vectors and the probability information. The concept vector describes a meaning of the input linguistic item as a whole. In block 1114, the processing engine 104 generates at least one output result item based, at least in part, on the probability information and/or the concept vector. The output result item(s) identify at least one content item that is relevant to the input linguistic item. In block 1116, the processing engine provides the output result item(s) to the user device 106.

In other examples, the output result item(s) convey some other outcome (other than the identification of relevant content items). For example, the output result item(s) can identify the dominant intent of a query or the entity name(s) associated with a document, ad, etc., without necessarily identifying relevant content items.

FIG. 12 shows a process 1202 that represents a more specific manner of operation of the system of FIG. 1, compared to the process 1102 of FIG. 11. In block 1204, with respect to a query Q having a set of query tokens, the processing engine 104 generates probability information. The probability information specifies a relative probability measure associated with each query token. In block 1206, the processing engine 104 generates a query concept vector $y_Q$ that describes a meaning of the query as a whole. In block 1208, with respect to a candidate content item D having a set of item tokens, the processing engine 104 generates probability information. The probability information specifies a relative probability measure associated with each item token. In block 1210, the processing engine generates an item concept vector $y_D$ that describes a meaning of the candidate content item as a whole. In block 1212, the processing engine 104 determines a similarity measure R(Q, D) between the query concept vector $y_Q$ and the item concept vector $y_D$, such as a cosine similarity measure In block 1214, the processing engine 104 determines a relevance of the query Q to the candidate content item D based, at least in part, on the similarity measure R (Q, D).

C. Representative Computing Functionality

Figure 13:
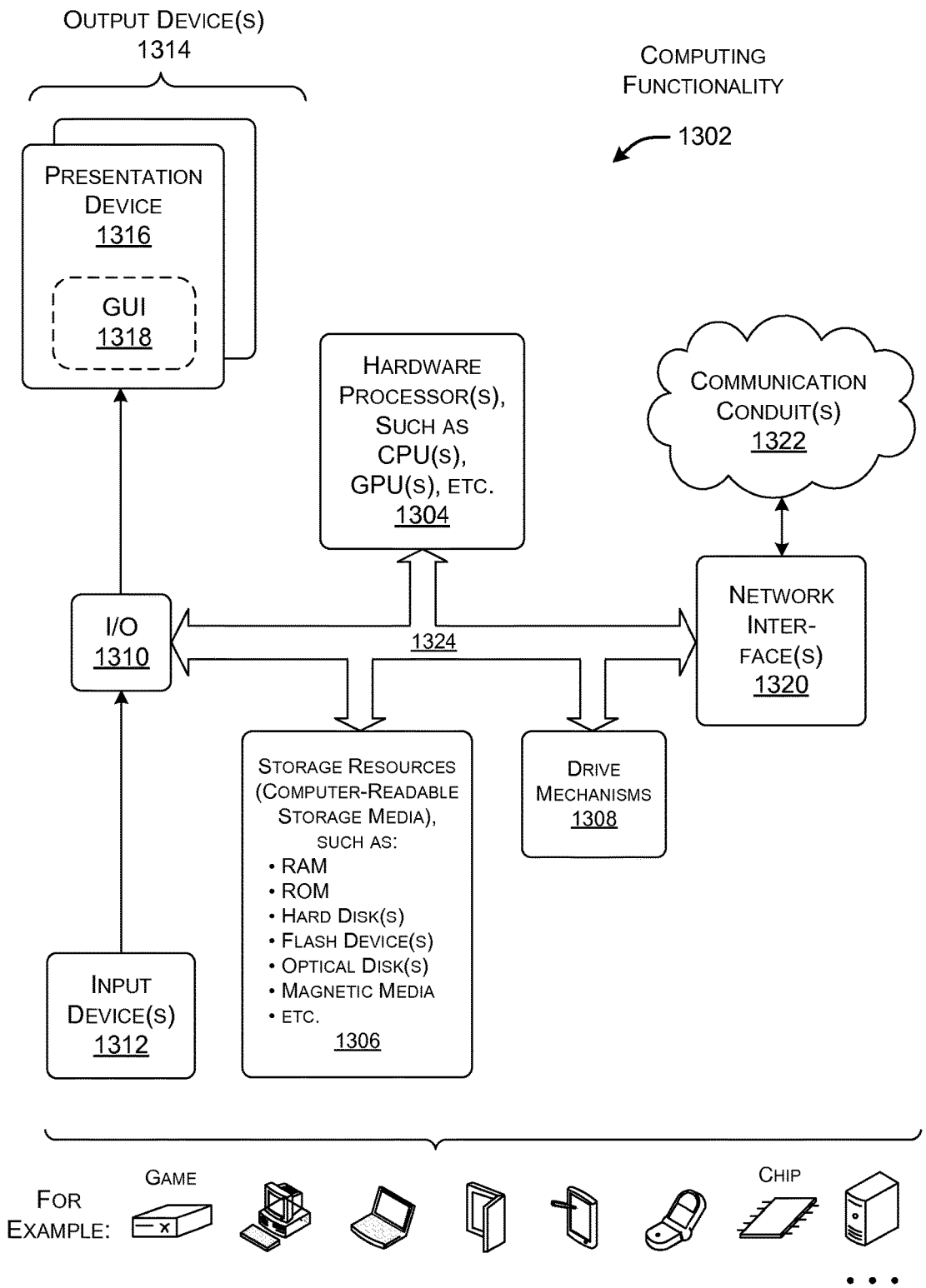
FIG. 13 shows illustrative computing functionality that can be used to implement any aspect of the features shown in the foregoing drawings.

FIG. 13 shows computing functionality 1302 that can be used to implement any aspect of the system 102 set forth in the above-described figures. For instance, the type of computing functionality 1302 shown in FIG. 13 can be used to implement any of the computing devices associated with the processing engine 104, the user computing device 106, etc. In all cases, the computing functionality 1302 represents one or more physical and tangible processing mechanisms.

The computing functionality 1302 can include one or more hardware processors 1304, such as one or more central processing units (CPUs), and/or one or more graphical processing units (GPUs), and so on. The computing functionality 1302 can also include any storage resources (also referred to as computer-readable storage media or computer-readable storage medium devices) 1306 for storing any kind of information, such as machine-readable instructions, settings, data, etc. Without limitation, for instance, the storage resources 1306 may include any of RAM of any type(s), ROM of any type(s), flash devices, hard disks, optical disks, and so on. More generally, any storage resource can use any technology for storing information (e.g., solid state, magnetic, optical, etc.). Further, any storage resource may provide volatile or non-volatile retention of information. Further, any storage resource may represent a fixed or removable component of the computing functionality 1302. The computing functionality 1302 may perform any of the functions described above when the hardware processor(s) 1304 carry out computer-readable instructions stored in any storage resource or combination of storage resources. The computing functionality 1302 also includes one or more drive mechanisms 1308 for interacting with any storage resource, such as a hard disk drive mechanism, an optical disk drive mechanism, and so on.

The computing functionality 1302 also includes an input/output component 1310 for receiving various inputs (via input devices 1312), and for providing various outputs (via output devices 1314). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1316 and an associated graphical user interface presentation (GUI) 1318. The presentation device 1316 may correspond to a physical monitor (e.g., a charge-coupled display device, a cathode ray tube device, a projection mechanism, etc.). Other output devices include a printer, a model-generating mechanism, a tactile output mechanism, an archival mechanism (for storing output information), and so on. The computing functionality 1302 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area computer network, a wide area computer network (e.g., the Internet), point-to-point connections, etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1302 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions can be embodied in the hardware logic itself.

The following summary provides a non-exhaustive list of illustrative aspects of the technology set forth herein.

According to a first aspect, a system is described for identifying at least one content item. The system is implemented by a processing engine that includes one or more computing devices. The system includes a user interface component configured to receive an input linguistic item from a user computing device, the input linguistic item having a set of input tokens. The system also includes an interpretation component configured to interpret the input linguistic item using a semantic transformation component that is implemented as a deep-structured neural network having three parts. The first part of the deep-structured neural network is configured to generate word embeddings associated with the respective input tokens. The second part of the deep-structured neural network is configured to generate state vectors based on the respective word embeddings, the state vectors reflecting respective contexts of the input tokens within the input linguistic item. And the third part of the deep-structured neural network provides a noise-identification mechanism that is configured to generate probability information based on the state vectors, the probability information specifying a relative importance measure associated with each input token that conveys an extent to which that input token contributes to an expression of an underlying meaning associated with the input linguistic item. The system also includes a response-generating component that is configured to generate at least one output result item based, at least in part, on the probability information, the output result item(s) identifying at least one content item that is relevant to the input linguistic item. The user interface component is further configured to provide the output result item(s) to the user computing device.

According to a second aspect, the deep-structured neural network is trained based on a corpus of training examples, each training example including at least a query submitted by at least one user, a content item, and an indication of whether the query is considered relevant to the content item.

According to a third aspect, the second part of the deep-structured neural network is a recurrent neural network.

According to a fourth aspect, the recurrent neural network is a bi-directional neural network.

According to a fifth aspect, the interpretation component is further configured to identify, based on at least the probability information, one or more input tokens in the input linguistic item that most effectively capture the underlying meaning of the input linguistic item.

According to a sixth aspect, the interpretation component is further configured to identify, based on at least the probability information, one or more input tokens in the input linguistic item that least effectively capture the underlying meaning of the input linguistic item According to a seventh aspect, the input linguistic item is a query Q, and the semantic transformation component corresponds to a query semantic transformation component. Further, the query semantic transformation component is configured to generate a concept vector $y_Q$ that describes a meaning of the query, based on the state vectors and the probability information.

According to an eighth aspect, the query semantic transformation component is configured to generate the concept vector $y_Q$ by forming a weighted sum of the state vectors, based on the probability information.

According to a ninth aspect, the system further includes an item semantic transformation component that is configured to operate on a set of item tokens associated with a candidate content item D, to generate: probability information, the probability information including a relative importance measure associated with each item token; and a concept vector $y_D$ that describes a meaning of the candidate content item. The item semantic transformation component also uses a deep-structured neural network having three respective parts.

According to a tenth aspect, the interpretation component is further configured to: determine a similarity measure between the concept vector $y_Q$ and the concept vector $y_D$; and determine a relevance of the query to the candidate content item based, at least in part, on the similarity measure.

According to an eleventh aspect, a method, implemented by at least one computing device, is described for identifying at least one content item. The method includes receiving, using a user interface component, an input linguistic item from a user computing device, the input linguistic item having a set of input tokens. The method then includes generating, using a semantic transformation component: word embeddings associated with the respective input tokens; state vectors based on the respective word embeddings, the state vectors reflecting respective contexts of the input tokens within the input linguistic item; and probability information based on the state vectors, the probability information specifying a relative importance measure associated with each input token that conveys an extent to which each input token contributes to an expression of an underlying meaning associated with the input linguistic item. The above-referenced generating of the word embeddings is performed using a first part of a deep-structured neutral network. The above-referenced generating of the state vectors is performed using a second part of the deep-structured neural network. And the above-referenced generating of probability information is performed using a third part of the deep-structured neural network. The method further includes generating, using a response-generating component, at least one output result item based, at least in part, on the probability information, the output result item(s) identifying at least one content item that is relevant to the input linguistic item. The method also includes providing, using the user interface component, the output result item(s) to the user computing device.

According to a twelfth aspect, a computer-readable storage medium is described for storing computer-readable instructions. The computer-readable instructions perform operations, when executed by one or more hardware processing devices, that include: receiving an input linguistic item from a user computing device, the input linguistic item having a set of input tokens; generating, using a first part of a deep-structured neural network, word embeddings associated with the respective input tokens; generating, using a second part of the deep-structured neural network, state vectors based on the respective word embeddings, the state vectors describing respective contexts of the input tokens within the input linguistic item; generating, using a third part of the deep-structured neural network, probability information based on the state vectors, the probability information specifying a relative importance measure associated with each input token that conveys an extent to which each input token contributes to an expression of an underlying meaning associated with the input linguistic item; (optionally) generating, using the third part of the deep-structured neural network, a concept vector based on the state vectors and the probability information, the concept vector describing a meaning of the input linguistic item; and generating, using a response-generating component, at least one output result item based, at least in part, on the probability information and/or the concept vector.

A thirteenth aspect corresponds to any combination (e.g., any permutation or subset) of the above-referenced first through twelfth aspects.

A fourteenth aspect corresponds to any device counterpart, system counterpart, means-plus-function counterpart, computer-readable storage medium counterpart, data structure counterpart, article of manufacture counterpart, graphical user interface presentation counterpart, etc. associated with the first through thirteenth aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a hardware processor; and
a storage resource storing machine-readable instructions which, when executed by the hardware processor, cause the hardware processor to:
receive an input linguistic item from a user computing device, the input linguistic item having a set of input words;
interpret the input linguistic item using a deep-structured neural network having at least three parts,
a first part of the deep-structured neural network being configured to generate word embeddings associated with the respective input words;
a second part of the deep-structured neural network being configured to generate word-specific state vectors based at least on the respective word embeddings, the word-specific state vectors representing individual input words and reflecting respective contexts of the individual input words within the input linguistic item; and
a third part of the deep-structured neural network being configured to:
generate word-specific probabilities by applying learned weights to the respective word-specific state vectors, the word-specific probabilities conveying respective extents to which corresponding input words contribute to a meaning of the input linguistic item; and
generate a concept vector for the input linguistic item, the concept vector being generated by applying the word-specific probabilities to the word-specific state vectors;
generate at least one output result item based, at least in part, on the concept vector, the at least one output result item identifying at least one content item that is relevant to the input linguistic item; and
provide the at least one output result item to the user computing device.

2. The system of claim 1, wherein the deep-structured neural network, including the learned weights of the third part, is trained using on a corpus of training examples, each training example including at least a query submitted by at least one user, a content item, and an indication of whether the query is considered relevant to the content item.

3. The system of claim 1, wherein the second part of the deep-structured neural network is a recurrent neural network.

4. The system of claim 3, wherein the recurrent neural network is a bi-directional neural network.

5. The system of claim 1, wherein the machine-readable instructions, when executed by the hardware processor, cause the hardware processor to:
identify, based at least on at least the word-specific probabilities, one or more input words in the input linguistic item that most effectively capture the meaning of the input linguistic item.

6. The system of claim 1, wherein the input linguistic item is a query and the at least one output result item is a document.

7. The system of claim 6, wherein the machine-readable instructions, when executed by the hardware processor, cause the hardware processor to:
generate the concept vector by forming a weighted sum of the word-specific state vectors, the sum being weighted using the word-specific probabilities.

8. The system of claim 6, wherein the machine-readable instructions, when executed by the hardware processor, cause the hardware processor to:
operate on a set of item words associated with a candidate document to:
using the first part of the deep-structured neural network, generate other word embeddings associated with the candidate document;
using the second part of the deep-structured neural network, generate other word-specific state vectors for the item words;
using the third part of the deep-structured neural network, generate other word-specific probabilities for the item words by applying the learned weights to the other word-specific state vectors; and
generate another concept vector that describes a meaning of the candidate document by applying the other word-specific probabilities to the other word-specific state vectors.

9. The system of claim 8, wherein the machine-readable instructions, when executed by the hardware processor, cause the hardware processor to:
determine a similarity measure between the concept vector for the query and the another concept vector for the candidate document
determine a relevance of the query to the candidate document based, at least in part, on the similarity measure; and
select the candidate document to include as an individual output result item based at least on the relevance of the query to the candidate document.

10. A method implemented by at least one computing device, the method comprising:
receiving an input linguistic item from a user computing device, the input linguistic item having a set of input tokens;
generating, using a first part of a deep-structured neural network, word embeddings associated with the respective input tokens;
generating, using a second part of the deep-structured neural network, state representations based at least on the respective word embeddings, the state representations reflecting respective contexts of the input tokens within the input linguistic item;
generating, using a third part of the deep-structured neural network:
probability information based at least on the state representations and learned weights, the probability information specifying relative importance measures that convey extents which the respective input tokens contribute to a meaning of the input linguistic item; and
a concept representation for the input linguistic item, the concept representation being generated by applying the probability information to the state representations;
generating at least one output result item based, at least in part, on the concept representation, said at least one output result item identifying at least one content item that is relevant to the input linguistic item; and providing said at least one output result item to the user computing device.

11. The method of claim 10, wherein the deep-structured neural network is trained based at least on a corpus of training examples, each training example including a query submitted by at least one user, a content item, and an indication of whether the query is considered relevant to the content item.

12. The method of claim 10, wherein the second part of the deep-structured neural network is a recurrent neural network.

13. The method of claim 12, wherein the recurrent neural network is a bi-directional neural network.

14. The method of claim 10, wherein the method further comprises using the probability information to identify one or more input tokens in the input linguistic item that most effectively capture the meaning of the input linguistic item.

15. The method of claim 10, wherein the method further comprises using the probability information to identify one or more input tokens in the input linguistic item that least effectively capture the meaning of the input linguistic item.

16. The method of claim 10, wherein the input linguistic item is a query, and the at least one output result item is a document determined to match the query based at least on another concept representation for the document.

17. The method of claim 16, wherein the state representations comprise state vectors, the concept representation comprises a concept vector, and generating of the concept vector comprises forming a weighted sum of the state vectors based at least on the probability information.

18. The method of claim 16, wherein the method further comprises operating on a set of item tokens associated with the document to:

using the third part of the deep-structured neural network, generate other probability information, the other probability information including a relative importance measure associated with each item token; and using the third part of the deep-structured neural network, generate the another concept representation for the document by applying the other probability information to other state representations for the item tokens, the other state representations being output by the second part of the neural network.

19. The method of claim 18, further comprising:

determining a similarity measure between the concept representation for the query and the another concept representation for the document; and determining a relevance of the query to the document based, at least in part, on the similarity measure.

20. A computer-readable storage medium storing computer-readable instructions, the computer-readable instructions performing operations, when executed by one or more hardware processing devices, that comprise:

receiving an input linguistic item from a user computing device, the input linguistic item having a set of input tokens;

generating, using a first part of a deep-structured neural network, word embeddings associated with the respective input tokens;

generating, using a second part of the deep-structured neural network, state vectors based at least on the respective word embeddings, the state vectors describing respective contexts of the input tokens within the input linguistic item;

generating, using a third part of the deep-structured neural network having learned weights, probability information based at least on the state vectors, the probability information specifying relative importance measures that convey extents to which respective input tokens contribute to a meaning of the input linguistic item;

generating a concept vector by applying the probability information to the state vectors, the concept vector describing the meaning of the input linguistic item; and generating at least one output result item based, at least in part, on the probability information and/or the concept vector, wherein the first part, the second part, and the third part of the deep-structured neural network are trained together in advance of generating the at least one output result item.

* * * * *